US012792048B1

(12) United States Patent
Kumar et al.

(10) Patent No.: US 12,792,048 B1
(45) Date of Patent: Nov. 10, 2026

(54) SYSTEM TO DETERMINE POSE OF AN AUTONOMOUS MOBILE DEVICE FOR PERCEPTION TASKS

(71) Applicant: AMAZON TECHNOLOGIES, INC., Seattle, WA (US)

(72) Inventors: Dhruva Kumar, San Jose, CA (US); Richard W. Kim, San Ramon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 18/614,397

(22) Filed: Mar. 22, 2024

(51) Int. Cl.
*G05D 1/246* (2024.01)
*G05D 1/648* (2024.01)
*G06Q 30/0283* (2023.01)
*G05D 107/40* (2024.01)

(52) U.S. Cl.
CPC ......... *G05D 1/2462* (2024.01); *G05D 1/6484* (2024.01); *G06Q 30/0283* (2013.01); *G05D 2107/40* (2024.01)

(58) Field of Classification Search
CPC ............... G05D 1/2462; G05D 1/6484; G05D 2107/40; G06Q 30/0283
USPC ............................................................ 701/26
See application file for complete search history.

(56) References Cited

U.S. PATENT DOCUMENTS 12,070,847 B1 * 8/2024 Ebrahimi Afrouzi ........................ B25J 9/1684
2022/0104675 A1 * 4/2022 Schneider ........... A47L 11/4011
2025/0017139 A1 * 1/2025 Zhu ........................ G05D 1/246
2025/0165009 A1 * 5/2025 Wang .................. A47L 11/4011
2025/0241499 A1 * 7/2025 Jones ..................... G05D 1/648

* cited by examiner

*Primary Examiner* — Mahmoud S Ismail
(74) *Attorney, Agent, or Firm* — Athorus, PLLC

(57) ABSTRACT

An autonomous mobile device (AMD) moves within a physical space and performs object perception tasks, such as checking whether a door is open or closed, using sensor data acquired from a sensor having a field-of-view (FOV). To perform the task, an enrolled object must be visible within the FOV. A view pose indicates a location and orientation in the physical space that is expected to place the enrolled object within the FOV. A map is generated based on previously acquired sensor data, indicating one or more of visible or non-visible regions. A visible region encompasses poses for which the enrolled object was visible. A non-visible region encompasses poses for which the enrolled object was not visible. When an object perception task is requested for the enrolled object, a view pose within the visible region is determined. The AMD may then move to the view pose and acquire sensor data.

20 Claims, 9 Drawing Sheets

SYSTEM TO DETERMINE POSE OF AN AUTONOMOUS MOBILE DEVICE FOR PERCEPTION TASKS

BACKGROUND

An autonomous mobile device (AMD) moves throughout a physical space that may include obstacles, uneven floors, and so forth.

BRIEF DESCRIPTION OF FIGURES

The detailed description is set forth with reference to the accompanying FIGURES. In the FIGURES, the left-most digit(s) of a reference number identifies the FIGURE in which the reference number first appears. The use of the same reference numbers in different FIGURES indicates similar or identical items or features. The FIGURES are not necessarily drawn to scale, and in some FIGURES, the proportions or other aspects may be exaggerated to facilitate comprehension of particular aspects.

Figure 1:
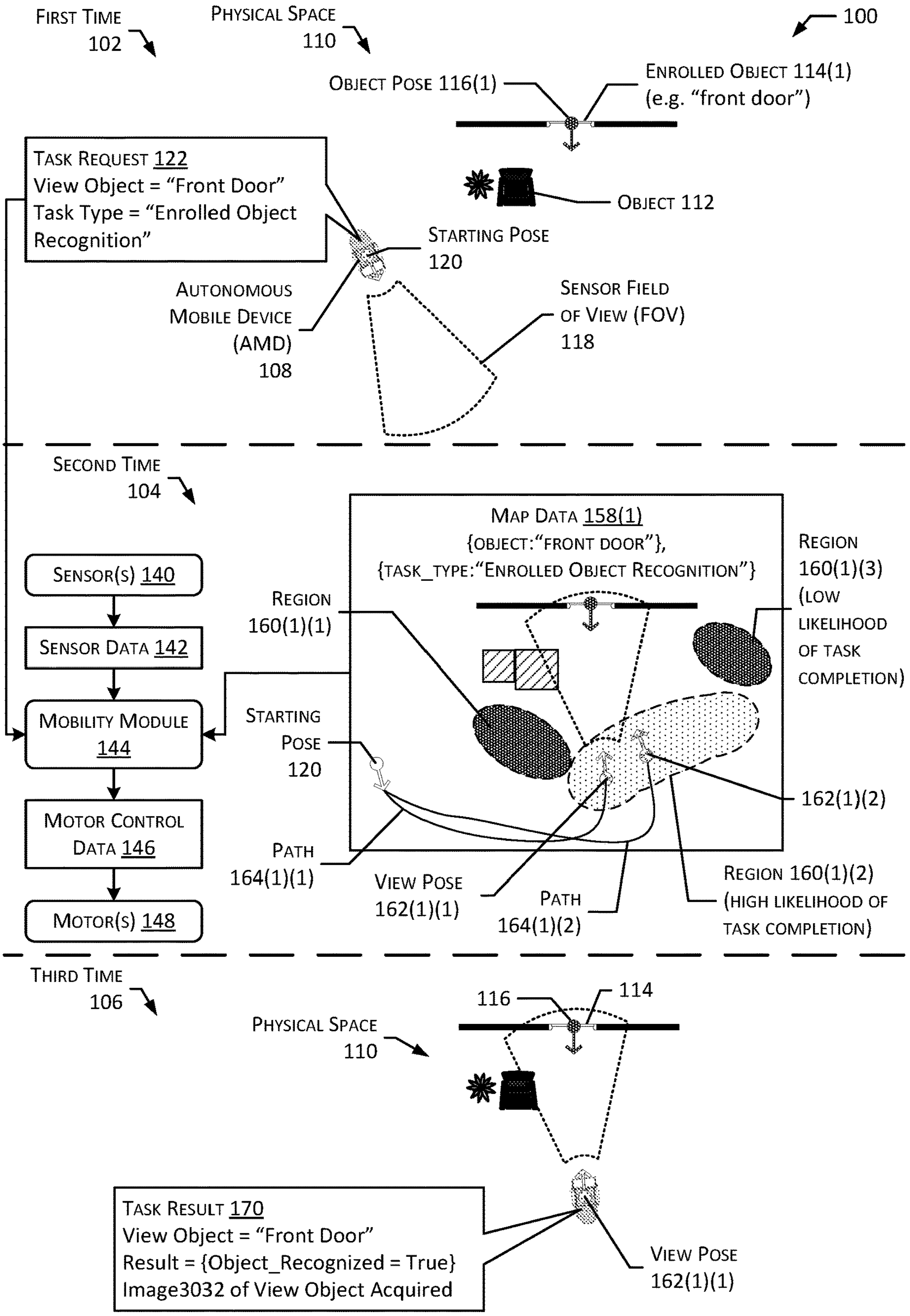
FIG. 1 illustrates an autonomous mobile device (AMD) that determines a view pose for a perception task, according to some implementations.

While implementations are described herein by way of example, those skilled in the art will recognize that the implementations are not limited to the examples or FIGURES described. It should be understood that the FIGURES and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement that allows the AMD to move between locations in a physical space without being driven or controlled by a user. A movement system may include one or more motors driving one or more of wheels or legs to enable the movement of the AMD.

The AMD may move to perform various tasks that involve acquisition of sensor data about objects in the physical space. An object may be enrolled as part of a training phase of operation. The AMD may acquire sensor data about an object while in a pose that can be characterized as an enrollment pose. The AMD may move through the physical space to an enrollment pose. At the enrollment pose, the AMD acquires sensor data about an object to be enrolled. The sensor data may be processed to determine information about the now enrolled object for later use. This information may include location, size, orientation, classification, and so forth of the object. User input may also be used. For example, user input comprising a name for the object, such as "front door", may be acquired and stored in association with the object. Pose data for an enrollment pose may specify a location and orientation in physical space, e.g. x, y coordinates or x, y, and z coordinates with respect to a coordinate system and a yaw angle or pitch and yaw angles with respect to the coordinate system. Enrollment may be performed in response to user input indicating a particular enrollment pose or may be performed in an automated manner (e.g. during an automated object enrollment approach utilizing computer vision object detection or another form of object detection).

The AMD may perform tasks that involve one or more enrolled objects. For example, one task may involve acquiring a picture of a particular object in the form of a door, such as the "front door". In another example, the AMD may be directed to perform a task to determine or predict a state of an object, such as whether a "front door" object is open or closed, whether a deadbolt object on the "front door" is locked or unlocked, and so forth.

A naïve approach to acquiring data about an enrolled object would be to attempt to return to the enrollment pose. However, this approach may fail in some instances.

Localization errors due to sensor noise, map errors, and so forth may prevent the AMD from returning to the exact enrollment pose. This may place the AMD in a pose that is unsuitable to complete the task. Attempting to return to the enrollment pose may result in the AMD performing time consuming maneuvers to try and reach the enrollment pose.

Changes in the physical space such as movement of furnishings, changing lighting conditions, and so forth may result in the enrollment pose being unsuitable to provide the sensor data needed to perform the task. Some tasks may require sensor data obtained from a pose that is different from the enrollment pose. For example, identifying and acquiring a picture of the door may be most successful using sensor data that is acquired from a pose in front of the door, while determining or predicting whether the door is fully closed may be most successful using sensor data that is obtained from a pose that is able to view an edge of the door opposite the hinges.

The AMD may perform one or more task types that utilize sensor data. For example, a task type of "recognize object" may attempt to recognize a previously enrolled object, e.g. may determine if a previously enrolled object is represented by newly acquired sensor data. In another example, a task type of "predict object state" may determine a state of an enrolled object, such as "open", "closed", "locked", "unlocked", "on", "off", and so forth.

This disclosure describes, inter alia, systems and techniques to determine a view pose for an AMD to complete a specified perception task that utilizes sensor data acquired by sensors onboard the AMD. Map data may be determined based on processing sensor data acquired from one or more acquisition poses and assessing a likelihood of completion of a task type. The map data comprises one or more regions. Each region is associated with a portion of the physical space, an enrolled object, a task type, and a metric that is indicative of likelihood of completion of the task type.

In one implementation the sensor data used to determine the map data may be acquired using dedicated exploration. With dedicated exploration, the AMD is moved to various acquisition poses proximate to an enrolled object and acquires sensor data at these poses. For example, after enrollment of an object, the AMD may move within the physical space and attempt to acquire sensor data about the object.

In another implementation the sensor data used to determine the map data may be acquired opportunistically. With opportunistic acquisition, acquisition poses and sensor data are acquired while the AMD is performing other tasks. For example, the AMD may determine acquisition poses and acquire sensor data as the AMD moves from one room to another responsive to a user command to “come here”.

The sensor data acquired from the acquisition poses may be processed to determine if a particular task type associated with a particular enrolled object is able to be completed. Acquisition poses may then be grouped based on these results to determine a region that specifies a particular portion of the physical space. Various techniques may be used to determine the regions. For example, a region may be determined that encompasses a set of adjacent acquisition poses that resulted in a successful completion of the task type for the enrolled object. Similarly, a region may be determined that encompasses a set of adjacent acquisition poses that resulted in unsuccessful completion of the task type for the enrolled object. In one or more implementations, a region may be determined that encompasses a set of adjacent acquisition poses that resulted or is determined to be likely to result in a successful completion of the task type for the enrolled object, and a region may be determined that encompasses a set of adjacent acquisition poses that resulted or is determined to be likely to result in unsuccessful completion of the task type for the enrolled object.

The sensor data acquired from the acquisition poses within a region may be processed to determine a metric that is indicative of a likelihood of completion of the task type for that region. In one implementation the metric may comprise a ratio of successful task completions to total task attempts within a specified region (or a ratio of successful task completions to unsuccessful task attempts, etc.).

With the map data available, requests to perform tasks that involve the enrolled object and task types may be efficiently performed. The AMD may generate internally or receive from an external source a task request that specifies “view object” that indicates a particular enrolled object and a task type that indicates the task which will require sensor data about the enrolled object.

Responsive to this task request, the AMD determines a view pose. The map data is assessed to determine a set of one or more regions that are associated with the enrolled object and the task type in the task request. The regions may then be assessed based on their respective metrics indicative of a likelihood of completion. For example, the regions may be sorted by the metric, such that the region with the greatest likelihood of completion is selected for subsequent use.

A set of view poses are determined within the selected region. For example, a set of view poses may be determined that fills the selected region with a minimum spacing between locations of the view poses. The orientation of respective view poses may be toward the enrolled object, or within a threshold range thereof.

The set of view poses are evaluated using a path planning algorithm to determine path plans from a starting pose to respective ones of the set of view poses. A path plan cost may be calculated for each of these path plans. For example, the path plan cost may take into consideration total path length, number of turns, estimated time to traverse the path, and so forth. The path plan with the lowest path plan cost may be selected.

The selected path plan may then be used to operate the movement system. For example, the path plan may be used to determine motor control data that operates motors in the AMD to move the AMD to the selected view pose.

Upon arrival at the selected view pose, the AMD may acquire sensor data and attempts to complete the task. If for some reason the task cannot be successfully completed, the AMD may move to another view pose.

In situations in which multiple task types involve the same enrolled object, various techniques may be used. In one implementation a view pose may be selected that is within an area in which the selected regions for the respective tasks overlap. In another implementation, a series of consecutive view poses in separate regions may be selected such that the overall path plan cost to reach those poses is minimized.

By using these techniques and systems the AMD is able to quickly complete tasks that utilize sensor data about enrolled objects in the physical space. These techniques minimize the time associated with completing such a task, while also improving the likelihood of a successful completion of the task. These techniques also improve resiliency in the event of a change in the physical space, allowing the AMD to efficiently determine and use another view pose in the event the sensor data acquired from a first view pose is insufficient for completion of the task.

Illustrative System

FIG. 1 illustrates at 100 an autonomous mobile device (AMD) that determines a view pose for a perception task, according to some implementations. This FIGURE illustrates events at a first time 102, a second time 104, and a third time 106. As used herein, a pose comprises a location and an orientation with respect to the physical space, or a representation thereof.

An autonomous mobile device (AMD) 108 is located within a physical space 110. The physical space 110 may include one or more objects 112. These objects 112 may include structural features, furniture, and so forth. Some objects 112 may be designated as enrolled objects 114. An enrolled object 114 may be enrolled during exploration, training, or other operation of the AMD 108. The enrolled object 114 may be associated with information obtained from user input. For example, the enrolled object 114(1) depicted here may be annotated based on user input as “front door”. Enrollment is discussed in more detail below.

An enrolled object 114 may have an object pose 116. The object pose 116 is indicative of the location and orientation of the enrolled object 114. For example, some enrolled objects 114 have a front and back, such as a couch. In another example, some objects 112 may move or have a portion thereof that moves, such as doors.

The AMD 108 includes various components. These are discussed in more detail with regard to FIGS. 8 and 9. These components include one or more sensors 140. During operation, a sensor 140 acquires sensor data 142 from the portion of the physical space 110 that is within a sensor field-of-view (FOV) 118. Depending upon the sensor 140, there may be a minimum distance, a maximum distance, and other characteristics that describe the sensor FOV 118. For example, if the sensor 140 is a monocular camera, the sensor FOV 118 may comprise the portion of the physical space 110 that is within focus.

The sensor(s) 140 may be fixed to the body of the AMD 108 or may be capable of one or more degrees of freedom with respect to the body. For example, a sensor 140 may be affixed to a pan and tilt mechanism, allowing the sensor 140 and corresponding sensor FOV 118 to be moved relative to the body of the AMD 108.

At the first time 102, the AMD 108 is shown at a starting pose 120 comprising a starting location and starting orientation. A task request 122 is received that comprises a view object indicative of the enrolled object 116(1) "front door" and a task type of "enrolled object recognition". For example, an application may generate a task request 122. The "enrolled object recognition" may involve acquiring sensor data 142 and determining that the sensor data 142 represents the enrolled object 114(1). In some implementations the sensor data 142 may then be used for other purposes. For example, responsive to a result that the enrolled object 114 is detected, sensor data 142 comprising an image of the enrolled object 114 may be presented to a user in a user interface.

At the second time 104, responsive to the task request 122 and using map data 158 based on a set of previously acquired sensor data 142, a mobility module 144 determines motor control data 146. The motor control data 146 operates one or more motors 148 of the AMD 108 to move the AMD 108 to a selected view pose 162.

The map data 158 is indicative of one or more objects 112 and their locations in the physical space 110. For example, the map data 158 may indicate the presence of objects 112 such as walls, furniture, enrolled objects 114, and so forth.

The map data 158 is determined based on processing sensor data 142 acquired from one or more acquisition poses (see FIG. 3) and assessing a likelihood of completion of a task type. The map data 158 comprises one or more regions 160. Each region 160 is associated with a portion of the physical space 110, an enrolled object 114, a task type, and a metric that is indicative of likelihood of completion of the task type.

In one implementation the sensor data 142 used to determine the map data 158 may be acquired using dedicated exploration. With dedicated exploration, the AMD 108 is moved to various acquisition poses proximate to an enrolled object 114 and acquires sensor data 142 at these poses. For example, after enrollment of an enrolled object 114, the AMD 108 may move within the physical space 110 and attempt to acquire sensor data 142 about the enrolled object 114 from different poses.

In another implementation the sensor data 142 used to determine the map data 158 may be acquired opportunistically. With opportunistic acquisition, acquisition poses and sensor data 142 are acquired while the AMD 108 is performing other tasks. For example, the AMD 108 may determine acquisition poses and acquire sensor data 142 as the AMD 108 moves from one room to another responsive to a user command to "come here".

The sensor data 142 acquired from the acquisition poses may be processed to determine if a particular task type associated with a particular enrolled object is able to be completed. Acquisition poses may then be grouped based on these results to determine a region 160 that specifies a particular portion of the physical space 110. Various techniques may be used to determine the regions 160. For example, a region 160 may be determined that encompasses a set of adjacent acquisition poses that resulted in a successful completion of the task type for the enrolled object 114. Similarly, a region 160 may be determined that encompasses a set of adjacent acquisition poses that resulted in unsuccessful completion of the task type for the enrolled object 114.

The enrolled object 114 is indicative of one or more of the enrolled objects 114 that have been specified. The task type is indicative of one or more tasks that use sensor data 142 about the enrolled object 114 during operation.

The portion of the physical space 110 may be specified as a boundary, set of regular or irregular polygons, and so forth that correspond to an area in the physical space 110. In some implementations regions 160 may be specified for objects 112 that have not been enrolled.

The sensor data 142 acquired at acquisition poses within a region 160 may be processed to determine a metric that is indicative of a likelihood of completion of the task type for that region 160. In one implementation the metric may comprise a ratio of successful completions of the task type to unsuccessful completions of the task type within the region 160.

In the example depicted in FIG. 1, that map data 158(1) for the enrolled object 114(1) "front door" and the task type of "enrolled object recognition" is shown, comprising three regions 160(1)(1), 160(1)(2), and 160(1)(3). Regions 160(1)(1) and 160(1)(3) have respective metrics below a threshold value, indicative of a low likelihood of task completion based on sensor data 142 acquired from within these regions 160. In this example, a view from region 160(1)(1) toward the enrolled object 114(1) "front door" is occluded by a chair which would block the sensor FOV 118 and prevent completion of the task type. Continuing the example shown, a view from region 160(1)(3) toward the enrolled object 114(1) "front door" is from an angle that prevents completion of the task type.

In comparison, views from the region 160(1)(2) are associated with a high likelihood of task completion. Views from within this region 160(1)(2) are not occluded by other objects 112 in the map and are at an angle relative to the enrolled object 114(1) that permits completion of the task type.

Responsive to the task request 122, the mobility module 144 determines one or more candidate view poses 162. Each view pose 162 may specify a location of the AMD 108 and one or more of an orientation of the AMD 108 body or the sensor 140 and corresponding sensor FOV 118. The determination of one or more view poses is based on the enrolled object 114 and task type indicated in the task request 122 and the map data 158 that is associated with the enrolled object 114 and the task type. The mobility module 144 may determine one or more regions 160 for the specified enrolled object 114 and the task type. These regions 160 may be filtered or ranked to select those regions 160 that are associated with a high likelihood of completion of the task type. Continuing the example shown, region 160(1)(2) may be selected. Within the selected region 160, a set of one or more view poses 162 may be determined. In some implementations, view poses 162 may be determined in advance and retrieved from storage. In other implementations view poses 162 may be determined on demand.

In one implementation, a set of view poses 162 may be determined that fills the selected region 160 with a minimum spacing between locations of the view poses 162. The orientation of respective view poses 162 may be toward the enrolled object 114, or within a threshold angular range thereof. In another implementation, a set of view poses 162 may be determined randomly within the selected region 160. For example, the locations of the view poses 162 may be determined randomly within the selected region 160 and the orientation of the view poses 162 may be randomly determined within a threshold angular range of the enrolled object 114.

The set of view poses 162 are evaluated using a path planning algorithm to determine path plans that represent a path 164 from a starting pose 120 to respective ones of the set of view poses 162. In the example shown, path 164(1)(1) extends from the starting pose 120 to a first view pose 162(1)(1) and path 164(1)(2) extends from the starting pose 120 to a second view pose 162(1)(2).

A path plan cost may be calculated for each of these path plans. For example, the path plan cost may take into consideration total path length, number of turns, estimated time to traverse the path, and so forth. The path plan with the lowest path plan cost may be selected for subsequent use. In this illustration, the path 164(1)(1) has a lower path plan cost than the path 164(1)(2), and is selected for use.

The selected path plan may then be used to operate the movement system. For example, the path plan may be used to determine motor control data 146 that operates motors 148 in the AMD 108 to move the AMD 108 to the selected view pose 162(1)(1).

Upon arrival at the selected view pose 162(1)(1), the AMD 108 may acquire sensor data 142 and attempt to complete the task. If for some reason the task cannot be successfully completed, the AMD 108 may move to another view pose 162. The view pose 162 may be within the same region 160 or may be within another region 160 that is deemed to have a suitable likelihood of task completion.

Figure 4:
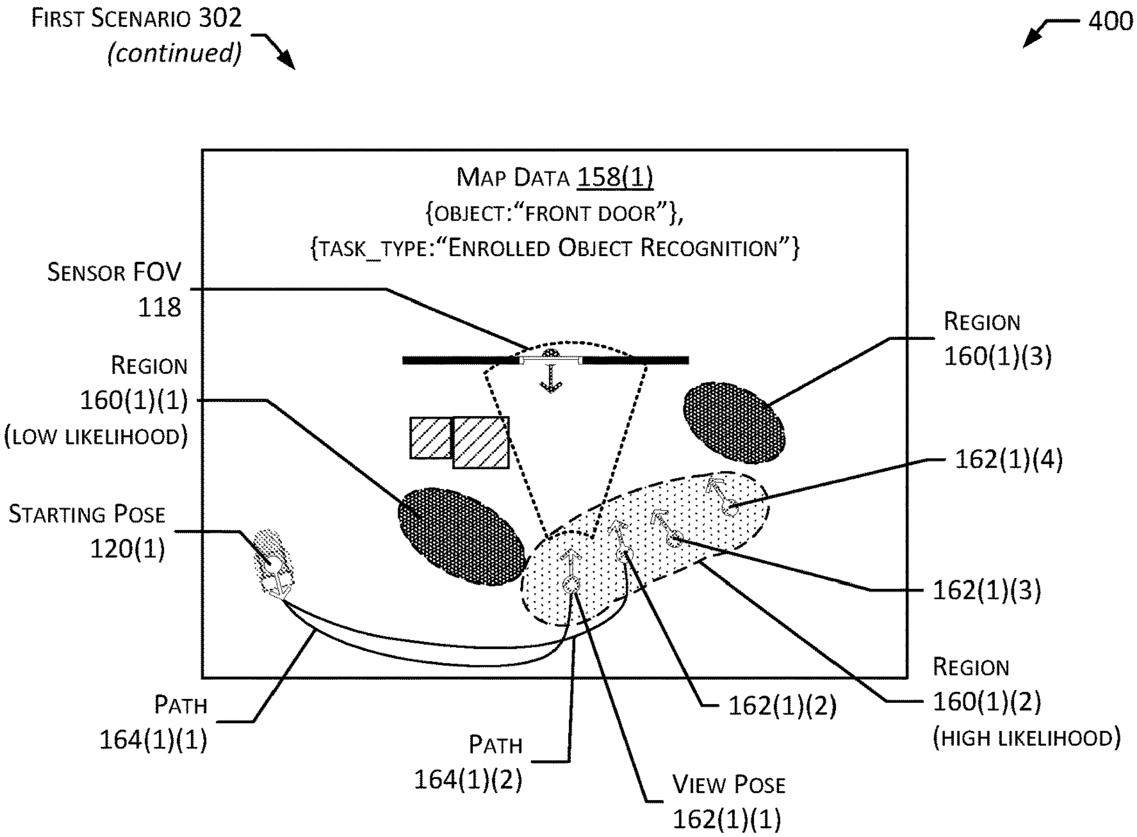
FIG. 4 illustrates map data for the scenarios of FIG. 3 and determination of view poses, according to some implementations.
Figure 4:
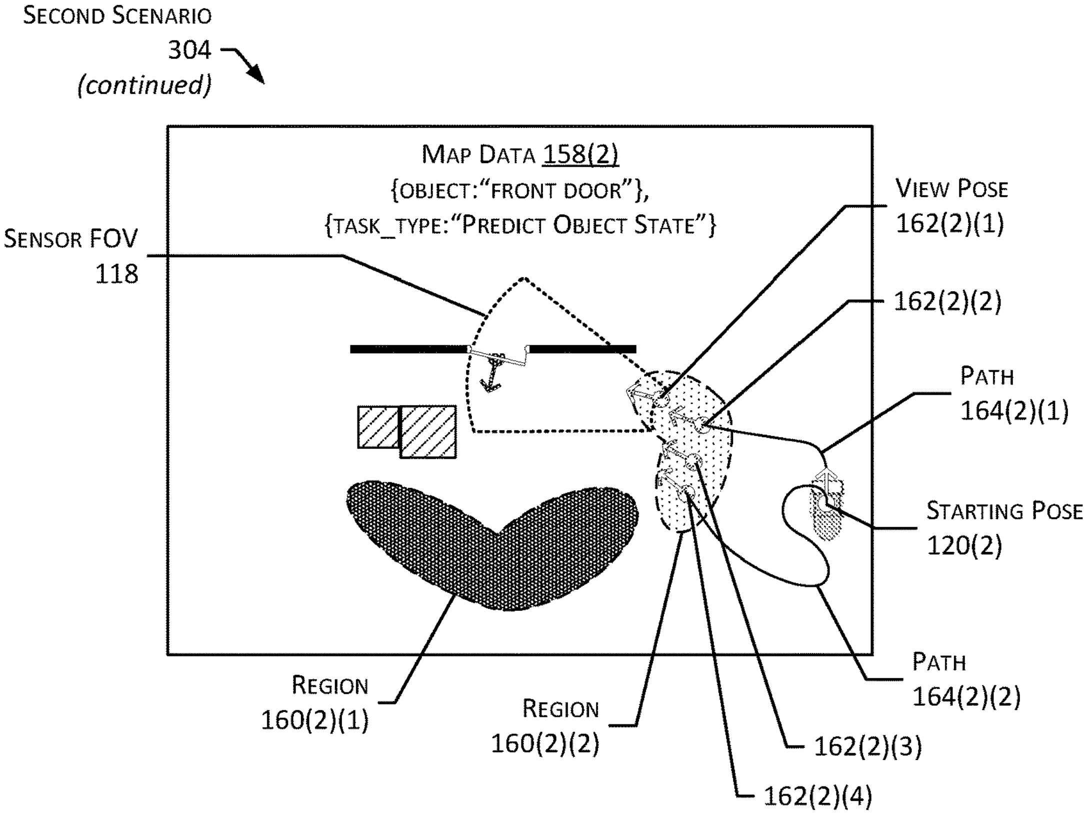

The determination of the view poses 162 is discussed in more detail with regard to FIG. 4.

At the third time 106 the AMD 108 is located at the selected view pose 162(1)(1) and has acquired sensor data 142 that allows successful completion of the task. In this example, the sensor data 142 has been acquired of the enrolled object 114(1) "front door" and the enrolled object 114(1) has been recognized therein. A task result 170 may be determined that is indicative of this successful completion. The task result 170 may then be returned to the application that generated the task request 122, or to another application. The task result 170 may include, or may provide data based on, the sensor data 142 acquired at the selected view pose 162.

Figure 2:
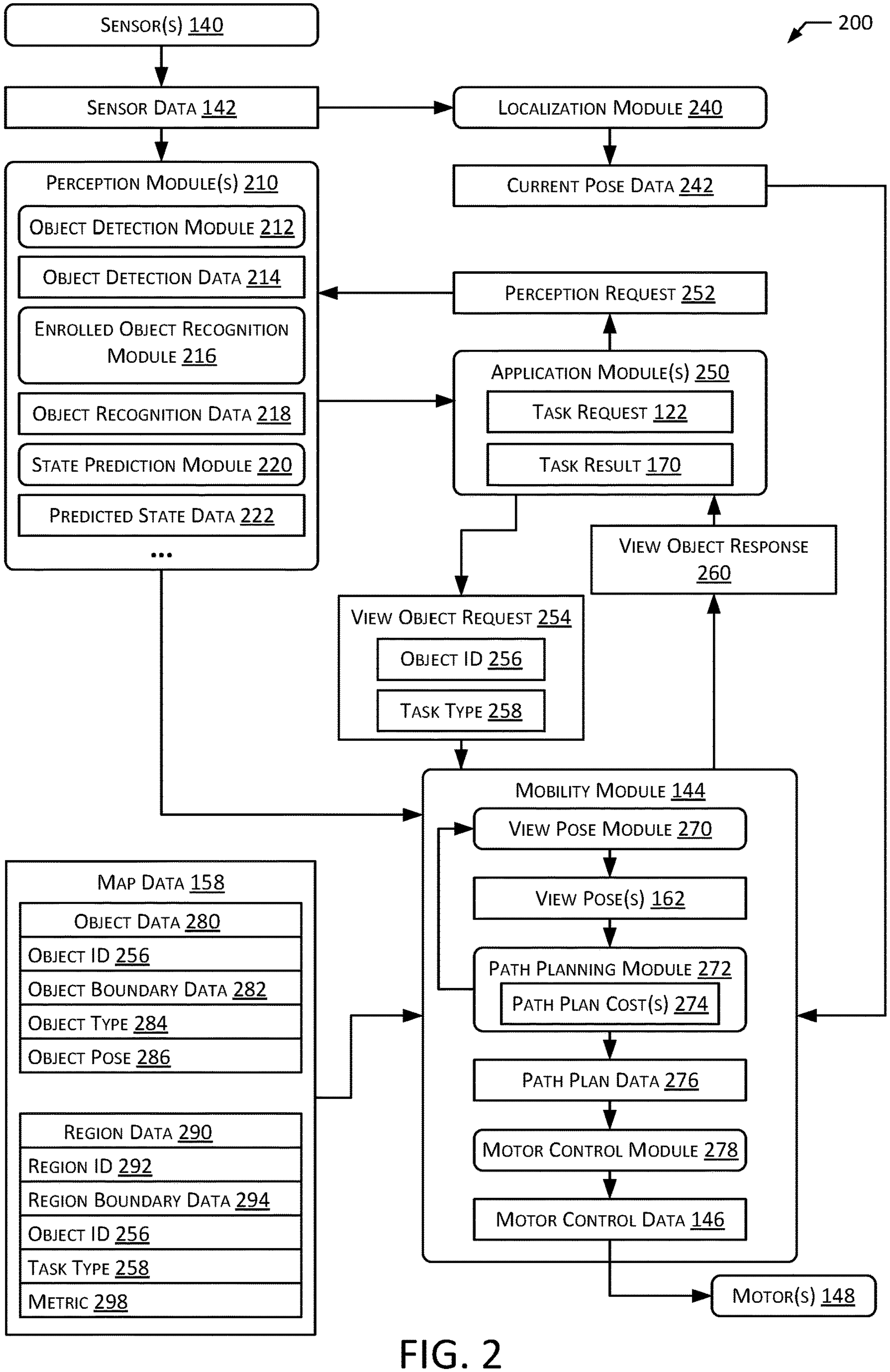
FIG. 2 is a block diagram of operation of the mobility module and other modules, according to some implementations.

FIG. 2 is a block diagram 200 of operation of the mobility module 144 and other modules, according to some implementations. The operations associated with these modules may be performed by one or more processors 804 of the AMD 108. The processors 804 and other components of the AMD 108 are described in more detail with regard to FIGS. 8 and 9.

As described above, one or more sensors 140 of the AMD 108 acquire sensor data 142. The sensor data 142 may be processed by one or more perception modules 210. The perception modules 210 process sensor data 142 acquired from one or more sensors 140 and determine output. The perception modules 210 may utilize various techniques and algorithms during operation. For example, the perception modules 210 may utilize previously trained machine learning algorithms, image comparison algorithms, and so forth.

A localization module 240 accepts sensor data 142 and determines current pose data 242 indicative of the current pose of the AMD 108 at a particular time. The localization module 240 may utilize various techniques to determine the current pose. For example, the localization module 240 may utilize one or more simultaneous localization and mapping (SLAM) algorithms to process sensor data 142 and determine current pose data 242 indicative of a location of the AMD 108 in the physical space 110 and orientation of the AMD 108 with respect to one or more reference axes. In another example, odometry algorithms may use inertial measurement unit (IMU) data, wheel speed data, and so forth to determine the current pose of the AMD 108 in the physical space 110.

The perception modules 210 may include an object detection module 212 that determines object detection data 214 indicative of an object 112 represented by the sensor data 142. For example, the object detection module 212 may determine that the object 112 "chair" is present within image data acquired by a camera. The object detection data 214 may be indicative of one or more characteristics of the object 112, such as an object classification, object type, object pose, and so forth. In some implementations the object detection data 214 may include a confidence value that is indicative of a likelihood that the information determined about the object 112 represented within the sensor data 142 is correct. For example, a machine learning network may accept the senor data 142 as input and provide as output an indication as to whether an object 112 with an object classification of "furniture" is detected and a confidence value as to that classification.

The perception modules 210 may include an enrolled object recognition module 216 that determines object recognition data 218 that indicates whether a previously enrolled object 114 is represented by the sensor data 142. For example, the enrolled object recognition module 216 may determine that the enrolled object 114(1) "front door" is present within image data acquired by a camera. The object recognition data 218 may be indicative of the enrolled object 114 and whether the enrolled object 114 has been determined to be represented within the sensor data 142. In some implementations the object recognition data 218 may include a confidence value that is indicative of a likelihood that the determination as to whether the enrolled object 114 is represented within the sensor data 142 is correct. For example, a machine learning network may accept the sensor data 142 as input and provide as output an indication as to whether the enrolled object 114(1) "front door" is detected and a confidence value as to that detection.

The perception modules 210 may include a state prediction module 220 that determines predicted state data 222 indicative of a state of the object 112. For example, the state prediction module 220 may process image data that is associated with the enrolled object 114(1) "front door" and attempt to determine a state of "door open" or "door closed" of the door. The states may be appropriate to the object classification or function of the object 112. For example, states associated with a door or window may include "open", "closed", "locked", "unlocked", and so forth. In another example, states associated with a kitchen stove may include "on" or "off". The state prediction module 220 may comprise a previously trained machine learning network that accepts as input the sensor data 142 and determines as output the predicted state of the object 112.

In some implementations one or more functions of one or more modules may be combined into a single module. For example, a single previously trained machine learning network may accept sensor data 142 as input and provide as output object detection data 214, object recognition data 218, and predicted state data 222.

In some implementations one or more of the perception modules 210 may execute responsive to a perception request 252. The perception request 252 may specify information such as a time associated with sensor data 142, view pose 162, an object identifier indicative of a particular enrolled object 114, a class of object to be detected, and so forth. One or more application modules 250 may generate a perception request 252 that specifies one or more of the perception modules 210 to be used to process incoming sensor data 142.

One or more application modules 250 may perform various functions such as facilitating a video conference, directing the AMD 108 to find a particular user, performing a sentry patrol, and so forth. For example, an application module 250 (not shown) may be used to perform a sentry patrol, traversing various areas within the physical space 110 and checking the state of enrolled objects 114 to confirm that exterior doors are closed and locked, windows are closed and locked, the kitchen stove is off, confirm no unauthorized users are present, and so forth.

The application module 250 may generate a task request 122. The task request 122 may be determined responsive to user input, expiration of a timer, receipt of a message from an external system, sensor data 142 acquired by the sensors 140 of the AMD 108, and so forth. For example, responsive to a sound associated with breaking glass, a sentry patrol application may generate one or more task requests 122 to inspect various enrolled objects 114 such as exterior doors and windows.

The application module 250 may determine, based on the task request 122, one or more perception requests 252 and one or more view object requests 254. As described above, the perception requests 252 are provided to the perception module(s) 210 and may specify one or more of the perception modules 210 to be used to process incoming sensor data 142 that are associated with a set of one or more specified view poses 162. For example, upon determining that the AMD 108 is at the view pose 162, a perception request 252 may be sent to the perception modules 210 to request the operation of the perception modules 210 used to perform the requested task.

The view object requests 254 may be provided to the mobility module 144. The view object requests 254 may comprise an object ID 256 and a task type 258. The object ID 256 may specify an object 112, such as an enrolled object 114. For example, the object ID 256 may indicate the object ID "4193" that is associated with the enrolled object 114(1). The task type 258 is indicative of a particular task that utilizes output from one or more of the perception modules 210. In some implementations, each perception module 210 may be associated with a respective task type 258.

After processing a view object request 254, the mobility module 144 may provide to the application module 250 a view object response 260. The view object response 260 may comprise information indicative of whether the AMD 108 has arrived at a view pose 162, as described next.

During operation, the mobility module 144 accesses previously determined map data 158. The map data 158 may comprise object data 280 and region data 290. The object data 280 comprises information about a particular object 112. In some implementations the object data 280 may include information about enrolled objects 114 and non-enrolled objects. The object data 280 may comprise one or more of an object identifier (ID) 256, object boundary data 282, object type 284, object pose 286, and so forth. The object boundary data 282 indicates the physical boundaries of the object 112 with respect to the physical space 110. For example, the object boundary data 282 may be represented by a polygon of specified dimensions with respect to an object pose 286. The object type 284 indicates a classification of the object 112, such as "furniture", "structure", "door", "window", "toy", and so forth. The object pose 286 comprises data indicative of the object pose 116, such as the location and orientation of the object 112 with respect to the physical space 110.

The region data 290 comprises one or more of a region ID 292, region boundary data 294, object ID 256, task type 258, one or more metrics 298, and so forth. The region ID 292 indicates the particular region 160. The region boundary data 294 is indicative of the boundary of the region 160 with respect to the physical space 110. In some implementations the boundary may be specified with respect to one or more points (e.g. with respect to coordinates for a point in a coordinate system) and a function, such as a Gaussian function, and a threshold value. For example, the boundary may be represented as a distance from a specified point at which a value of a Gaussian function indicative of a likelihood of success is greater than a threshold value. In some implementations, region boundary data may comprise coordinates for a set of points in a coordinate system defining an outer boundary of a region.

In accordance with one or more implementations, an object ID 256 indicates the object 112 that the region 160 is associated with. The task type 258 indicates the task type that the region 160 is associated with. The one or more metrics 298 are indicative of one or more metrics with regard to the region 160. For example, the metric 298 may be indicative of a likelihood of completion of the task type 258 for that region 160. In one implementation the metric 298 may comprise a ratio of successful completions of the task type 258 to unsuccessful completions of the task type 258 within the region 160. The metric 298 may be expressed as a binary value, a probability, a value within a specified range of values, and so forth. In another implementation the metric 298 may comprise a probability distribution function, or values associated with a probability distribution function, that is indicative of the likelihood of completion of the task type 258.

In some implementations a region 160 specified by the region data 290 may be designated as an excluded region, unsuitable for use. For example, a region 160 that has a metric 298 that is less than a minimum threshold value may be designated as an excluded region for performance of the task type 258 with regard to the associated object ID 256. During operation of the mobility module 144, excluded regions may be omitted from consideration. It is worth nothing that an excluded region may remain traversable by the AMD 108 during path planning and subsequent autonomous movement, and the exclusion is with regard to the determination of a view pose 162.

The map data 158 may be expressed using one or more different data structures. For example, the map data 158 may be expressed as a set of separate maps, layers each associated with a different attribute or type of object 112, bitmap, vector data, database, tree structure, linked list, and so forth.

Figure 3:
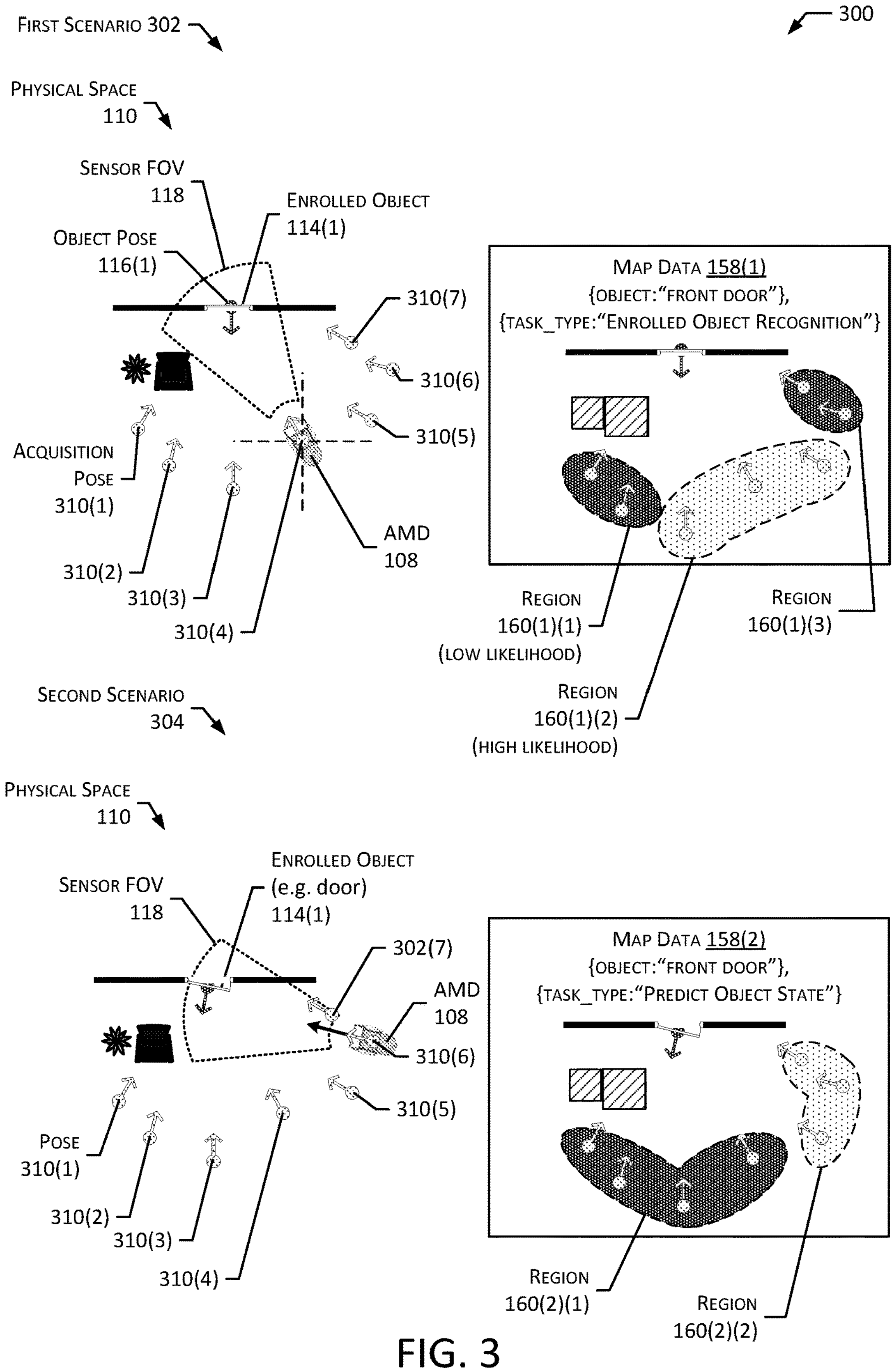
FIG. 3 illustrates the physical space and determining corresponding map data for different scenarios involving different tasks, according to some implementations.

The determination of the map data 158 is discussed in more detail with regard to FIG. 3. The map data 158 may be updated based on sensor data 142 that is subsequently acquired, as discussed in more detail with regard to FIG. 6.

During operation, the mobility module 144 may receive current pose data 242 from the localization module 240 and may access the map data 158 that was previously determined. Responsive to a view object request 254, the mobility module 144 may determine a view pose 162 and move the AMD 108 to that view pose 162 to acquire sensor data 142 to perform the task type 258 associated with the object ID 256.

The mobility module 144 may comprise a view pose module 270. The view pose module 270 accepts as input the view object request 254 and the region data 290 to determine a set of one or more view poses 162. The view pose module 270 determines a set of one or more regions 160 that are associated with the object ID 256 and the task type 258. The set of one or more regions 160 may be ranked or filtered based on one or more of their metrics 298. For example, the set of one or more regions 160 may be ranked to determine a first region 160 of the set that has a greatest metric 298 indicative of a likelihood of completion of the task type 258. With regard to the example shown in FIG. 1, the region 160(1)(2) is selected. In some implementations more than one region 160 may be selected. For example, a top k regions 160 as ranked with regard to a metric 298 may be selected, where k is a nonzero integer value.

During operation, the view pose module 270 may use the map data 158. The view pose module 270 may determine view poses 162 that are not located within an object 112, are at least a minimum distance from an object 112, and so forth. For example, the view pose module 270 may avoid placing a view pose 162 within the boundary of an object 112, such as a wall or furniture, that is represented by the map data 158. The view pose module 270 may determine view poses 162 that, based on the map data 158 indicative of the locations of objects 112, have an unobstructed line of sight to the object 112 associated with the object ID 256. For example, the view pose module 270 may determine a view pose 162 that is a minimum distance from an object 112 and does not have another object 112 between the view pose 162 and the enrolled object 114.

A set of one or more view poses 162 may be determined within each selected region 160. In one implementation, the set of one or more view poses 162 may be determined that fills the selected region 160 with a minimum spacing between locations of the view poses 162. The orientation of respective view poses 162 may be toward the enrolled object 114, or within a threshold angular range thereof.

In another implementation, the set of one or more view poses 162 may be determined randomly within the selected region 160. For example, locations of the view poses 162 may be determined randomly within the selected region 160 and the orientation of the view poses 162 may be randomly determined within a threshold angular range of the enrolled object 114, such that the sensor FOV 118 is directed towards the enrolled object 114.

In other implementations other techniques may be used to determine view poses 162 in the set of one or more view poses 162. For example, acquisition poses 310 may be stored and subsequently used as view poses 162. In another example, a view pose 162 may be determined by perturbing one or more of the location or the orientation of an acquisition pose 310.

Each pose within the one or more view poses 162 may be determined such that it is consistent with the operating characteristics of the sensor 140 to be used, sensor FOV 118 for that sensor 140, and so forth. For example, if a sensor 140 has minimum and maximum ranges, only view poses 162 that would result in the sensor FOV 118 being at least at the minimum range and at most the maximum range from the enrolled object 114 would be included in the set of view poses 162. In the event that a task type 258 involves multiple sensors 140, the most restrictive operating characteristics of a sensor 140 in the multiple sensors 140 may be considered as the limiting factor, such that the view poses 162 in the set of view poses 162 would satisfy the operating characteristics of the most restrictive sensor 140.

The set of one or more view poses 162 may be provided to a path planning module 272. Individual view poses 162 within the set of view poses 162 may be evaluated using the path planning module 272 to determine path plan data 276 and associated path plan cost 274. The path planning module 272 may implement one or more path planning algorithms that determine path plan data 276 indicative of a path 164 from a first pose to a view pose 162. In some implementations the first pose may be the starting pose 120. The path planning module 272 may implement one or more path planning algorithms to determine the path plan data 276. For example, the path planning module 272 may implement the A* graph traversal and pathfinding algorithm as promulgated by Peter Hart, Nils Nilsson, and Bertram Raphael, the D* incremental search algorithm as promulgated by Anthony Stentz, or other algorithms.

The path plan cost 274 may be based on one or more characteristics of a path 164 as indicated by the path plan data 276. The path plan cost 274 may be based on one or more of a length of the path 164, a number of turns of the path 164, an estimated time to traverse the path 164, a number of segments in the path 164, a number of waypoints of the path 164, a number of doors that the path 164 goes through, data representative of where people or pets are likely to be encountered along the path 164, and so forth. The path plan cost 274 may comprise a sum of weighted values, with weights associated with each characteristic of a path 164. The larger the sum of these weighted values, the higher the path plan cost 274. For example, a straight line path 164 that is 2 meters long and has no turns, such as moving straight ahead, may have a lower path plan cost 274 than a rectangular path 164 with four 90 degree turns that is also 2 meters long. In other implementations, other algorithms may be used to determine the path plan cost 274.

The path planning module 272 may select one or more view poses 162 based on their respective path plan costs 274. For example, the path plan data 276, indicative of a particular view pose 162 that has the lowest path plan cost 274 may be selected. In another example, a set of the k lowest path plan costs 274 may be used to determine a plurality of path plan data 276, each instance of path plan data 276 representing a path 164 to a respective one of a plurality of view poses 162.

In other implementations the path plan data 276 selected may be further based on information about the likelihood of completion of the task type 258 and the path plan cost 274. For example, regions 160(4) (1) and 160(4) (2) are deemed suitable for use as they are associated with metrics 298 that are greater than a minimum threshold value of likelihood of completion of the task type 258. An overall score may be calculated based on the metric 298 for a region 160 and the path plan cost 274 of path plan data 276 to reach a view pose 162 within that region 160. This may result in the AMD 108 selecting path plan data 276 for a view pose 162 that has a greatest path plan cost 274 to reach, but is associated with a greater metric indicative of likelihood of completion. In some implementations, the mobility module 144 may determine an order in which one or more view poses 162 are used such that one or more overall path plan costs 274 are minimized. For example, the mobility module 144 may determine that based on the view object request 254 that the AMD 108 will use a set of two view poses 162(1) and 162(2). The mobility module 144 may determine path plan costs 274 from the current pose to each of the view poses 162, and select the lowest path plan cost from the current pose to one of the view poses 162 in the set of view poses 162(1) and 162(2). The mobility module 144 may then determine a path plan cost 274 to the remaining view pose 162. The mobility module 144 may attempt to minimize total overall path costs between the view poses 162. For example, in accordance with one or more implementations, the mobility module 144 may determine a first total path plan cost from a current pose to a first view pose and from the first view pose to a second view pose, and then determine a second total path plan cost from a current pose to the second view pose and from the second view pose to the first view pose, and then select the lower of the first total path plan cost and the second total path plan cost.

Once selected, the path plan data 276 may be provided to a motor control module 278. The motor control module 278 may use the path plan data 276 to determine one or more instances of motor control data 146 that is then used to operate the one or more motors 148 of a movement system 806. For example, the motor control data 146 may specify operating left and right wheel motors 148 at a specified rotation rate for a specified number of rotations.

While not shown in this FIGURE for clarity, during operation the mobility module 144 may use sensor data 142, output from the perception modules 210, current pose data 242, and so forth. For example, the mobility module 144 may use current pose data 242 to determine if the AMD 108 is following the path 164 indicated by the path plan data 276, adjust course to maintain that path 164, to perform collision avoidance of obstacles, to determine arrival at the destination view pose 162, and so forth.

Once the AMD 108 arrives at the destination view pose 162, the mobility module 144 may send a view object response 260 to the application module(s) 250 or other modules. The view object response 260 may indicate the current pose of the AMD 108, that the AMD 108 has arrived at a location suitable for viewing the object 112 or enrolled object 114 indicated in the view object request 254, or other data.

Responsive to the view object response 260, the application module 250 or another module may send a perception request 252 to the perception module(s) 210. The perception request 252 may specify the object ID 256, task type 258, perception module 210 to be used, and so forth. For example, the perception request 252 may indicate that the enrolled object recognition module 216 is to attempt to determine if the enrolled object 114(1) "front door" is represented by the sensor data 142. Responsive to the perception request 252, the perception module 210 may return output to another module such as the application module 250.

In other implementations the perception modules 210 may process sensor data 142 on an ongoing basis. In this implementation, before arrival to the view pose 162 or upon arrival, the sensor data 142 may be acquired and processed, and the output may be provided to the application module(s) 250 without an additional perception request 252.

In the event that one or more of the perception modules 210 indicate a failure to complete the task type 258, the system may proceed to take further action to complete the task type 258. For example, if the enrolled object recognition module 216 indicates that an enrolled object 114 specified by the object ID 256 is not represented in the sensor data 142, the process may proceed to select, and move the AMD 108 to, another view pose 162. In some implementations a maximum number of attempts, time out timer, or other mechanism may be used to limit retries.

The sensor data 142 acquired at the view pose(s) 162 that the AMD 108 has moved to may be processed as described above to update the map data 158. For example, based on the success or failure of one or more of the perception modules 210 performing one or more task types 258 based on the sensor data 142, the region data 290 may be updated.

In some implementations the functions associated with the modules may differ from those depicted in this figure. For example, in some implementations the visual perception module 210 and the application modules 250 may be combined, the visual perception modules 210 and the mobility module 144 may be combined, the localization module 240 may be part of the mobility module 144, and so forth.

FIG. 3 illustrates at 300 the physical space 110 and determining corresponding map data 158 for different scenarios involving different tasks, according to some implementations. A first scenario 302 and a second scenario 304 are depicted. For each scenario a portion of the physical space 110 is depicted to the left of the figure, while a representation of the map data 158 is depicted to the right of the figure.

The first scenario 302 involves the enrolled object 114(1) of "front door" and the task type 258 of "enrolled object recognition" in which the sensor data 142 is processed by the enrolled object recognition module 216 to determine object recognition data 218.

To enroll an object 112, the AMD 108 acquires sensor data 142 from an acquisition pose 310. For example, the AMD 108 may move throughout the physical space 110 during exploration of the physical space 110 and acquire sensor data 142 from various acquisition poses 310. In another example, the AMD 108 may be directed based on user input to a pose that is proximate to an object 112 to be enrolled. Based on user input, the object 112 may be stored as an enrolled object 114. For example, a user may provide user input such as "front door" that indicates a label associated with a recognized object of "door" that has been determined based on sensor data 142. Based on the user input, the label and associated information about that object 112, such as object pose 116, size, shape, feature vectors, and so forth may be stored as enrolled object data.

The AMD 108 may move to a plurality of acquisition poses 310(1), 310(2), . . . (A) to gather information about the enrolled object 114. In this illustration, acquisition poses 310(1)-(7) are shown, each at different locations and orientations in the physical space 110. The sensor data 142 from the acquisition poses 310 is processed using one or more of the perception modules 210 to determine if the sensor data 142 from an acquisition pose 310 is suitable for completing a particular task type 258.

The acquisition poses 310 may be selected using one or more techniques. In one implementation the acquisition poses 310 may be determined given a particular enrolled object 114. For example, a set of acquisition poses 310 may be determined that are within a threshold distance of an enrolled object 114. In another implementation the acquisition poses 310 may be opportunistic, involving poses of the AMD 108 while performing other tasks or which have been added to a path 164 of the AMD 108 while performing other tasks. For example, while moving through the physical space 110 to perform a delivery task, the AMD 108 may acquire sensor data 142 along the path 164 and designate various points along the path 164 as acquisition poses 310. In another example, a path 164 for another task may be amended to include an acquisition pose 310, such as providing a brief stop and rotation of the AMD 108 or sensor 140 to move the sensor FOV 118 to acquire sensor data 142, then proceeding.

In the first scenario 302, the task type 258 involves the enrolled object recognition module 216 for the first enrolled object 114(1) "front door". Some of the acquisition poses 310 have a line of sight to the enrolled object 114 occluded. For example, the view of the enrolled object 114 from acquisition poses 310(1) and 310(2) is occluded by a houseplant and chair. As a result of this occlusion, the enrolled object recognition module 216 is unable to determine the enrolled object 114.

Given the extreme angle of the acquisition poses 310(6) and 310(7), the sensor data 142 obtained from these poses is also insufficient to allow the enrolled object recognition module 216 to determine the enrolled object 114.

However, the sensor data 142 acquired from the enrolled poses 310(3)-(5) does allow the enrolled recognition module 216 to operate and determine the enrolled object 114.

Based on the acquisition poses 310 and the determined success or failure, or other metrics such as a confidence value indicative of likelihood of accurate output, one or more regions 160 may be determined. In this first scenario 302, region 160(1)(1) is determined based on the acquisition poses 310(1) and 310(2). This region 160(1)(1) may be associated with a metric 298 that indicates a low likelihood of success, due to the failure of the enrolled object recognition module 216 to recognize the enrolled object 114 due to occlusion.

Region 160(1)(2) is determined based on the acquisition poses 310(3), 310(4), and 310(5). This region 160(1)(2) may be associated with a metric 298 that indicates a high likelihood of success, due to the success of the enrolled object recognition module 216 to recognize the enrolled object 114.

Region 160(1)(3) is determined based on the acquisition poses 310(6) and 310(7). This region 160(1)(3) may be associated with a metric 298 that indicates a low likelihood of success, due to the failure of the enrolled object recognition module 216 to recognize the enrolled object 114 due to the angle of the sensor FOV 118 relative to the enrolled object 114.

The acquisition poses 310 and the sensor data 142 obtained from those acquisition poses 310 may be processed to assess performance with regard to a plurality of different task types 258.

In the second scenario 304, the task type 258 involves the state prediction module 220 for the same first enrolled object 114(1) "front door". For this example, the state prediction module 220 is attempting to determine if the enrolled object 114(1) "front door" is in the "open" or the "closed" state. The same acquisition poses 310(1)-(7) are shown. However, due to the differences in the nature of the task being performed, different regions 160 result. As mentioned before, acquisition poses 310 that are occluded by other objects 112, such as 310(1) and 310(2) are unsuitable. However, acquisition poses 310(3)-(4) are also unsuitable as they do not provide sufficient information to see if the edge of the door opposite the hinges is in fact closed and flush with the wall. Those acquisition poses 310(5)-(7) that are at a more extreme angle relative to the door, and on the swinging edge opposite the hinges, provide sensor data 142 that allows successful prediction as to whether the door is "open", such as being slightly ajar.

Based on the acquisition poses 310 and the determined success or failure, or other metrics such as a confidence value indicative of likelihood of accurate output, one or more regions 160 may be determined. In this second scenario 304, region 160(2)(1) is determined based on the acquisition poses 310(1) and 310(4). This region 160(2)(1) may be associated with a metric 298 that indicates a low likelihood of success, due to the failure of the state prediction module 220 to determine a state prediction with greater than a minimum threshold confidence value.

Region 160(2)(2) is determined based on the acquisition poses 310(5)-310(7). This region 160(2)(2) may be associated with a metric 298 that indicates a high likelihood of success, due to the success of the state prediction module 220 to determine a state prediction with greater than a minimum threshold confidence value.

Regions 160 may be determined using one or more algorithms. In one implementation, a region 160 may be based on acquisition poses 310 that have one or more metrics 298, such as whether the task completed successfully, confidence value, and so forth that are within a specified range. The relative arrangement of the acquisition poses 310 may be considered, such that a region 160 comprises adjacent or non-adjacent acquisition poses 310 that have a metric within the specified range. In some implementations techniques such as outlier rejection, blob detection algorithms, and so forth may be used to determine the boundaries of a region 160.

In some implementations the boundary of a region 160 may be based on dilating one or more of the acquisition poses 310 within the region 160. For example, each acquisition pose 310 may be dilated by 15 cm, and the boundary of the region 160 may be specified by a perimeter of a union of these dilated poses. In other implementations other techniques may be used to determine a boundary of the region 160.

In some implementations the boundary of a region 160 may be based on a function for which the metric 298 associated with one or more view poses 162 may be provided as input. For example, a Gaussian function may accept as input the metric 298 value and an edge of a boundary of the region 160 may be specified as points at which the output from the function is less than or equal to a threshold value.

In some implementations the values of metrics 298 associated with different points with a region 160 may vary. For example, the region 160 may comprise a plurality of cells, with each cell representing a particular area in the physical space 110, and each cell may be associated with a respective metric 298. Continuing the example, the region 160 may comprise adjacent cells for which the respective metrics 298 of the cells is greater than or equal to a threshold value.

FIG. 4 illustrates at 400 map data 158 for the scenarios of FIG. 3 and determination of a view poses 162, according to some implementations. In this FIGURE map data 158 is depicted, with additional details such as a starting pose 120 and possible paths 164 to respective view poses 162 overlaid.

A view object request 254 may comprise information indicative of an object ID 256 and one or more task types 258. In the first scenario 302, the object ID 256 is indicative of the first enrolled object 114(1) "front door" and a first task type 258(1) of "enrolled object recognition" that uses the enrolled object recognition module 216.

As described with regard to FIG. 2, responsive to the view object request 254 the mobility module 144 determines path plan data 276 that is used to operate the AMD 108 to move to a specified view pose 162.

In this illustration the view pose module 270 has determined a set of view poses 162(1)(1)-162(1)(4) within the region 160(1)(2). The path planning module 272 determines path plan data 276 representative of paths 164 and associated path plan costs 274 to reach each of these view poses 162(1)(1)-162(1)(4) from a starting pose 120(1). In this illustration two paths 164(1)(1) and 164(1)(2) are shown. Each view pose 162(1)(1)-162(1)(4) is within the region 160(1)(2) and is at a location and orientation relative to the enrolled object 114 specified by the view object request 254 that places the enrolled object 114 within the sensor FOV 118 of a sensor 140 that is associated with performance of the specified task type 258. As described above, the view pose 162 may be selected for use that has a lowest path plan cost 274, or other score or metric. Once selected the AMD 108 may be operated, based on the path plan data 276, to move to the view pose 162. In this illustration, the AMD 108 may be operated to move from the starting pose 120(1) along path 164(1)(1) to the view pose 162(1)(1). Once there, sensor data 142 may be acquired and processed by the perception module(s) 210.

In the second scenario 304, the object ID 256 is indicative of the first enrolled object 114(1) "front door" and a second task type 258(2) of "predict object state" that uses the state prediction module 220. While this is the same enrolled object 114 as the first scenario 302, the different task necessitates acquisition of sensor data 142 from a different view pose 162 to successfully complete the task.

In this illustration the view pose module 270 has determined a set of view poses 162(2)(1)-162(2)(4) within the region 160(2)(2). The path planning module 272 determines path plan data 276 representative of paths 164 and associated path plan costs 274 to reach each of these view poses 162(2)(1)-162(2)(4) from a starting pose 120(2). In this illustration two paths 164(2)(1) and 164(2)(2) are shown. Each view pose 162(2)(1)-162(2)(4) is within the region 160(2)(2) and is at a location and orientation relative to the enrolled object 114 specified by the view object request 254 that places the enrolled object 114 within the sensor FOV 118 of a sensor 140 that is associated with performance of the specified task type 258. As described above, the view pose 162 may be selected for use that has a lowest path plan cost 274, or other score or metric. Once selected the AMD 108 may be operated, based on the path plan data 276, to move to the view pose 162. In this illustration, the AMD 108 may be operated to move from the starting pose 120(1) along path 164(2)(1) to the view pose 162(2)(2). Once there, sensor data 142 may be acquired and processed by the perception module(s) 210.

In implementations in which several task types 258 are specified for a single object ID 256, path planning may be performed to determine a series of view poses 162. The order of and movements between the view poses 162 may be selected to minimize overall path plan cost 274 to reach the specified view poses 162. For example, assuming the AMD 108 begins at the starting pose 120(1), the AMD 108 may be moved to the first view pose 162(1)(1) and then the second view pose 164(2)(2). In another example, assuming the AMD 108 begins at the starting pose 120(2), the AMD 108 may be moved to the second view pose 164(2)(2) and then the first view pose 162(1)(1).

Figure 5:
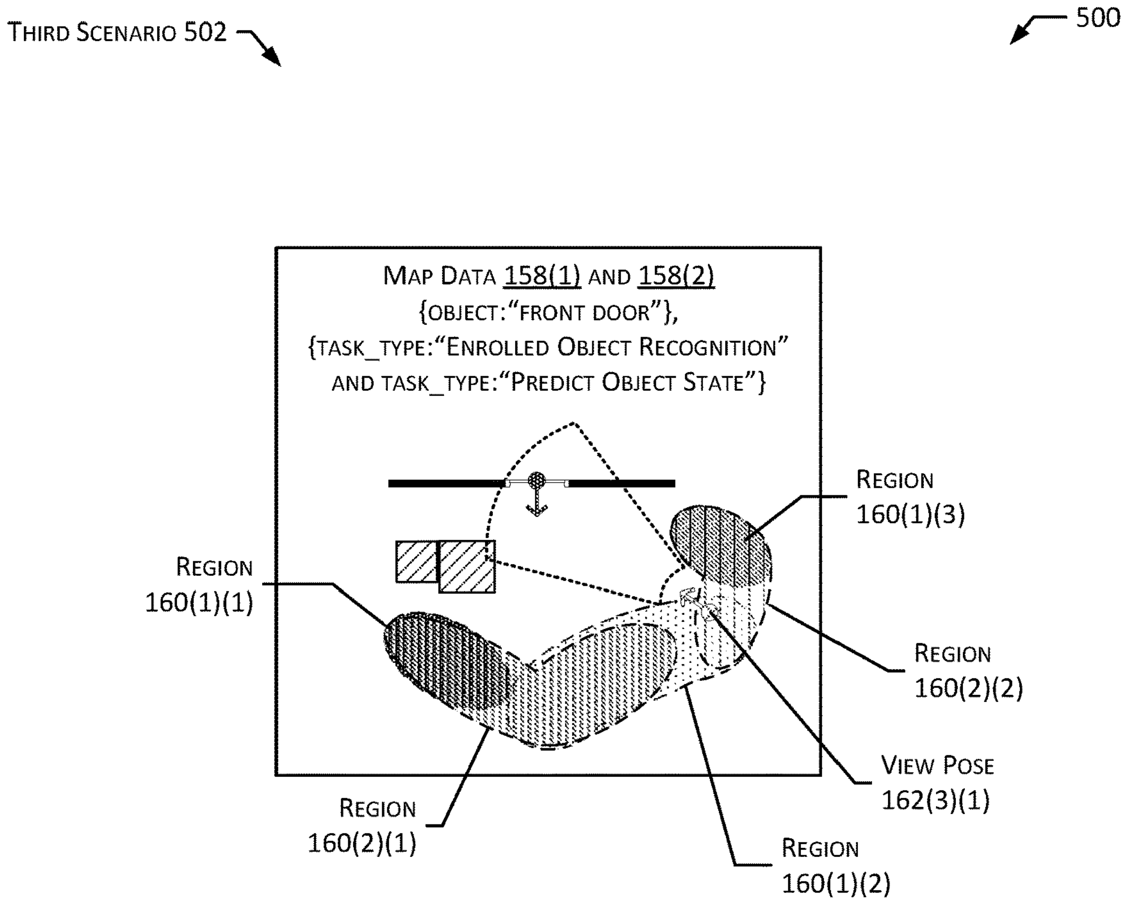
FIG. 5 illustrates combined map data for two tasks involving the same object and determination of a view pose, according to some implementations.

FIG. 5 illustrates at 500 combined map data 158(1) and 158(2) for two tasks involving the same enrolled object 114 and determination of a view pose 162 that satisfies both tasks, according to some implementations. In some situations, it may be possible to complete two or more tasks that involve the same enrolled object 114 by determining a view pose 162 that is located in the overlap between two or more regions 160 that have been deemed to have suitable likelihood of completion of their respective tasks.

In this illustration, the regions 160(1)(1)-160(1)(3) associated with the first scenario 302 and regions 160(2)(1) and 160(2)(2) associated with the second scenario 304 are depicted overlaid on one another. As mentioned with regard to FIG. 4, region 160(1)(2) has been deemed suitable for completion of the task of the first scenario 302 while region 160(2)(2) has been deemed suitable for completion of the task of the second scenario 304.

A portion of region 160(1)(2) overlaps (or intersects) region 160(2)(2). A view pose 162(3)(1) has been determined within this overlap or intersecting regions 160. The AMD 108 may be moved to this view pose 162(3)(1) and subsequently acquire sensor data 142 that is then used to complete both tasks.

Figure 6:
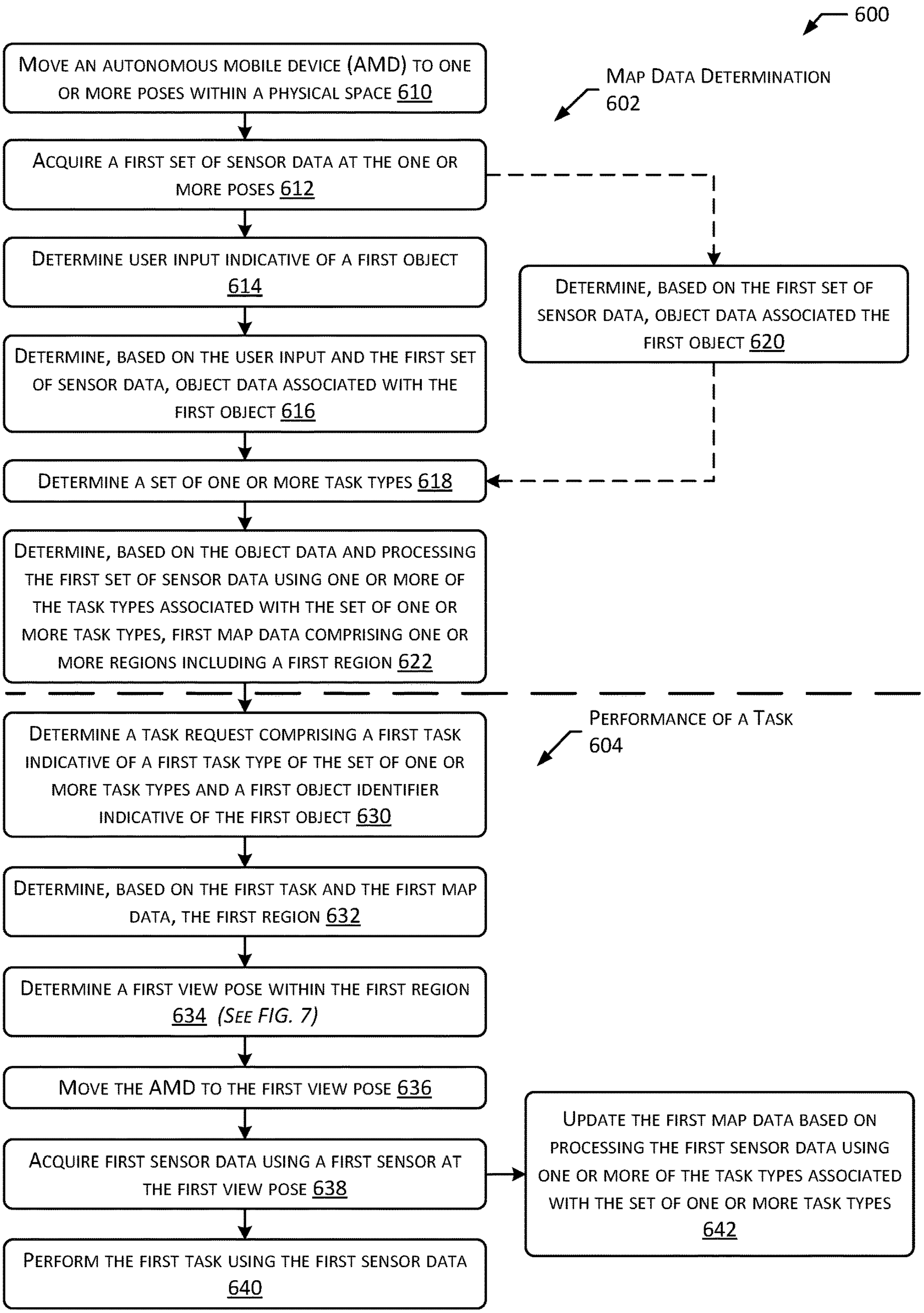
FIG. 6 is a flow diagram of a process to determine map data and view poses to complete a specified task, according to some implementations.

FIG. 6 is a flow diagram 600 of a process to determine map data 158 and view poses 162 to complete a specified task, according to some implementations. The process may be performed by one or more processors 804 of the AMD 108.

For ease of illustration, and not as a limitation, the process is shown in two sections: map data determination 602 and performance of a task 604.

At 610 the AMD 108 is moved to one or more poses within the physical space 110. For example, the AMD 108 may be moved to a plurality of acquisition poses 310.

At 612 a first set of sensor data 142 is acquired at the one or more poses. For example, at each acquisition pose 310, sensor data 142 may be acquired using one or more sensors 140.

At 614 user input indicative of a first object may be determined. For example, a user may conduct the AMD 108 on an exploration tour of the physical space 110 and provide input such as "robot, this is the front door". The user input may be associated with one or more of the poses and corresponding sensor data 142.

At 616, based on the user input and the first set of sensor data 142, object data associated with the first object is determined. For example, the object 112 indicated by the user input may be stored as an enrolled object 114.

At 618 a set of one or more task types 258 may be determined. For example, a set of task types 258 corresponding to the tasks performed by one or more perception modules 210 may be retrieved from memory 830.

In some implementations, as shown at 620, object data associated with the first object may be determined based on the first set of sensor data 142. This operation may be performed without user input. For example, during exploration the AMD 108 may process the sensor data 142 using the object detection module 212 to determine object detection data 214 indicative of "exterior door" for the first object. In some implementations some objects 112, once detected, may be enrolled without user intervention. Continuing the example, the "exterior door" may be enrolled as an enrolled object 114 labeled "exterior door".

At 622, based on the object data and processing the first set of sensor data 142 using one or more of the task types 258 associated with the set of one or more task types 258, map data 158 comprising one or more regions 160 including a first region 160(1) is determined. For example, sensor data 142 that is associated with enrolled objects 114 may be processed using the perception modules 210 corresponding to the task types 258 that are applicable to that enrolled object 114. As described above, based on the outcome of that processing, different instances of map data 158 and corresponding regions 160 may be determined. For example, each combination of object ID 256 and task type 258 may be associated with a specific set of regions 160.

At 630 a task request 122 is determined that comprises a first task indicative of a first task type 258(1) of the set of one or more task types 258 and a first object identifier (ID) 256 indicative of the first object. For example, the task request 122 may be received by the AMD 108 from another device, or may be generated by an application module 250 executing on one or more of the processor(s) 804 of the AMD 108.

At 632, based on the first task and the first map data 158, a first region 160(1) is determined. For example, the map data 158 may be queried to determine one or more regions 160 that are associated with the first task type 258(1) and the object ID 256. As described above, a region 160 may be selected based on a metric 298 that is indicative of a likelihood of completion of the associated task type 258.

At 634 a first view pose 162(1) is determined within the first region 160(1). This is discussed in more detail with regard to FIG. 7. The first view pose 162(1) comprises a first location within the first region 160(1) and a first orientation at the first location of one or more of the first sensor 140(1) or the AMD 108.

At 636 the AMD 108 is moved to the first view pose 162(1). For example, path plan data 276, with a destination of the first view pose 162(1), may be selected that corresponds to a lowest path plan cost 274. Based on the path plan data 276, motor control data 146 may be determined and used to operate the one or more motors 148 to move the AMD 108 to the first view pose 162(1).

At 638 first sensor data 142(1) is acquired using a first sensor 140(1) at the first view pose 162(1). For example, the AMD 108 may move to the location specified by the first view pose 162(1) and a moveable sensor 140 may be panned to the orientation specified by the first view pose 162(1).

At 640 the first task is performed using the first sensor data 142(1). For example, the first sensor data 142(1) may be processed by one or more of the perception modules 210 that are associated with the first task.

In one implementation, if the first task is unable to be completed, or completes unsuccessfully, the AMD 108 may be moved to another previously determined second view pose 162(2) and the process may acquire second sensor data 142(2) at the second view pose 162(2). The AMD 108 may continue through a previously determined set of view poses 162 until the first task is completed or a limit, such as a time or pose limit, is reached.

In another implementation, if the first task is unable to be completed, the process may be repeated. For example, the process may return to 632.

The map data 158, such as region data 290, may be updated based on later-acquired sensor data 142. Later-acquired sensor data 142, and the results therefrom, may supersede previously acquired sensor data 142 that has expired. In one implementation, at a first time, sensor data 142(1) may be acquired at a first pose, such as acquisition pose 310(1). At a second time, sensor data 142(2) is acquired at a second pose, such as acquisition pose 310(2). Instances of the sensor data 142, and associated results of processing using the one or more task types 258, may be timestamped using output from a clock, such as the clock 808. In other implementations, a sequence numbering scheme may be used. If the difference between current clock time and the timestamp associated with the sensor data 142 or associated results is greater than a threshold value, the sensor data 142 or associated results may be omitted from determining the map data 158. For example, the expired data may be omitted from determining the region boundary data 294. Continuing the example, the expired data may be omitted from determining the metric 298. In another example, with respect to a particular region 160, data from the last q (where q is a nonzero integer) poses where sensor data 142 was acquired may be used. As new sensor data 142 is acquired and new processing results are obtained, older sensor data 142 or the older processing results are discarded from consideration.

At 642 the first map data 158 is updated based on processing the first sensor data 142(1) using one or more of the task types 258 associated with the set of one or more task types 258. For example, sensor data 142 may be processed using the perception modules 210 corresponding to the task types 258 that are applicable to one or more enrolled objects 114 or other objects 112. In some situations, the task types 258 used to process the sensor data 142 may be associated with the enrolled objects 114 or other objects 112 that are within a threshold distance of the AMD 108, within the same room, and so forth. Based on the outcome of that processing, the map data 158 and corresponding regions 160 may be updated. For example, the results associated with each combination of object ID 256 and task type 258 may be used to modify one or more regions 160.

In some implementations, different weight values may be associated with the results of task types 258 used to process the later-acquired sensor data 142 and determine region data 290. Different weight values may be associated with the results of processing with respect to one or more task types 258. These weights may be used to adjust how a region 160 is modified based on the later-acquired sensor data 142. For example, a successful completion of a task type 258(1) may have a weight value of "+1.05", while an unsuccessful completion of the task type 258(1) may have a weight value of "−2.0". The weight values may be used to modify one or more of the metric 298 associated with the region 160 or a portion thereof, the boundary of the region 160, and so forth. Continuing the example, successful completions of the task type 258(1) would result in an increase in the metric 298 associated with the region 160, while unsuccessful completions of the task type 258(1) would result in a decrease in the metric 298 associated with the region 160.

In some implementations the region data 290 may be determined based on historical data associated with one or more of view poses 162 or acquisition poses 310. For example, a consecutive number of successes or failures of performance of a task type 258(1) at a specified view pose 162 may result in a change to the region data 290. In another example, a consecutive number of successes or failures of performance of the task type 258(1) within the region 160 may result in change to the region data 290. Continuing the example, a failure of more than p (where p is a nonzero integer value) consecutive view poses 162 within a region 160 may result in a decrease in the metric 298 or removal of the region 160.

Other information may be acquired and used to update the map data 158. For example, input data 860 from one or more of a user, module, system, and so forth, may be used to determine the map data 158. For example, a user may provide input that indicates a particular region 160 is not to be used. As a result of such input, the region 160 may be removed or may have a metric 298 value decreased.

The process may be implemented by a robotic device comprising a camera, one or more motors, one or more processors, and one or more computer readable media. The computer readable media stores first region data indicating a first region defined with respect to a first coordinate system, a first object, and a first metric associated with a likelihood of completion of a view task with respect to the first object. The computer readable media store also stores processor executable instructions which, when executed using the one or more processors, cause the robotic device to perform the following operations. Based on a determination to execute a first view task with respect to the first object and based on the first metric the one or more processors determine a first location within the first region, determine a first orientation for the first location, and cause, using the one or more motors, the robotic device to move to the first location and orient in accordance with the first orientation, and generate camera data using the camera.

In some implementations the computer readable media of the robotic device may store second region data indicating a second region defined with respect to the first coordinate system, the first object, and a second metric associated with a likelihood of completion of a view task with respect to the first object.

In some implementations the computer readable media of the robotic device may store processor executable instructions which, when executed using the one or more processors, cause the robotic device to perform operations comprising comparing the first metric to the second metric.

In some implementations the computer readable media of the robotic device may store processor executable instructions which, when executed using the one or more processors, cause the robotic device to perform operations comprising, based on the determination to execute the first view task with respect to the first object and based on the first metric, determining a second location within the first region, determining a first path cost for the first location, determining a second path cost for the second location, and comparing the first path cost to the second path cost.

In some implementations the computer readable media of the robotic device may store processor executable instructions which, when executed using the one or more processors, cause the robotic device to perform operations comprising based on the determination to execute the first view task with respect to the first object and based on the first metric, determining a second location within the first region, determining a first total path cost for a first path comprising a path from a current location to the first location and a path from the first location to the second location, determining a second total path cost for a second path comprising a path from the current location to the second location and a path from the second location to the first location, and comparing the first total path cost to the second total path cost.

Figure 7:
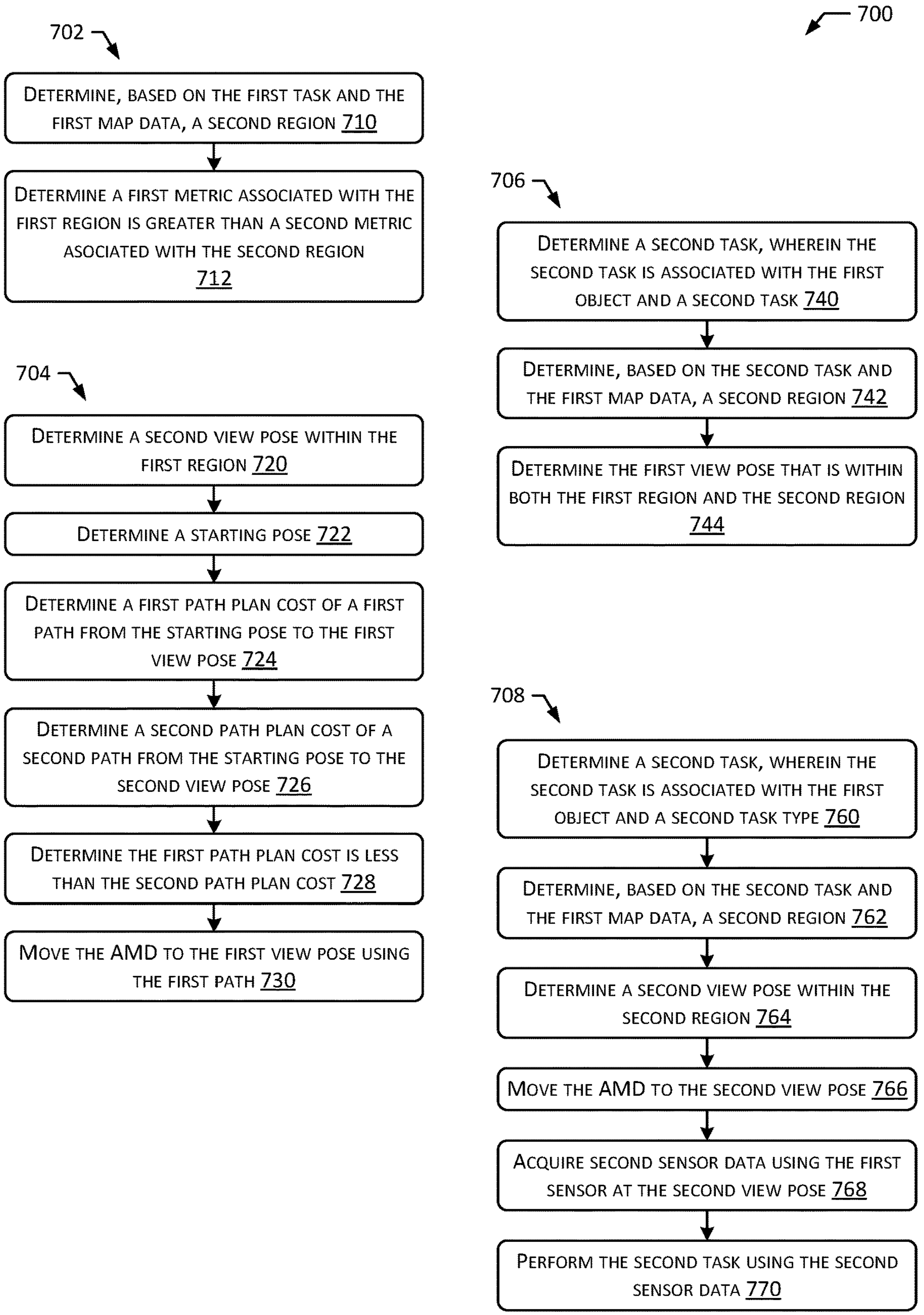
FIG. 7 is a flow diagram of some processes to determine the view poses to complete the specified task, according to some implementations.

FIG. 7 is a flow diagram 700 of some processes to determine the view poses 162 to complete the specified task, according to some implementations. The process may be performed by one or more processors 804 of the AMD 108. In some implementations, one or more of these processes may be used in combination during operation. These processes are described with regard to the process of FIG. 6.

At 702 a process is described that involves selecting a region 160 from a plurality of regions 160 based on their respective metrics 298. For example, the map data 158 may include a first region 160(1) and a second region 160(2) for the same object ID 256 and task type 258. At 710, based on the first task type 258(1) and the first map data 158, a second region 160(2) is determined. At 712 a first metric 298(1) associated with the first region 160(1) is determined to be greater than a second metric 298(2) that is associated with the second region 160(2). For example, the first metric 298(1) may indicate a likelihood of completion of 0.95 while the second metric 298(2) may indicate a likelihood of completion of 0.45. Based on the metrics 298, the first region 160(1) is selected due to the greater likelihood of completion.

At 704 a process is described that involves selecting a view pose 162 from several view poses 162 within the same region 160 based on the respective path plan costs 274. At 720 a second view pose 162(2) within the first region 160(1) is determined. The second view pose 162(2) comprises a second location within the first region 160(1) and a second orientation at the second location of one or more of the first sensor 140(1) or the AMD 108.

At 722 a starting pose 120 is determined. The starting pose 120 is indicative of a starting location and a starting orientation of the AMD 108. In some implementations the starting pose 120 may comprise the current pose data 242. In other implementations the starting pose 120 may be an endpoint of a previous task, expected pose after completing a planned movement, and so forth.

At 724 a first path plan cost 274(1) of a first path 164(1) from the starting pose 120 to the first view pose 162(1) is determined. For example, the path planning module 272 may determine first path plan data 276(1) and first path plan cost 274(1) to the first view pose 162(1).

At 726 a second path plan cost 274(2) of a second path 164(2) from the starting pose 120 to the second view pose 162(2) is determined. For example, the path planning module 272 may determine second path plan data 276(2) and second path plan cost 274(2) to the second view pose 162(2).

At 728 the first path plan cost 274(1) is determined to be less than the second path plan cost 274(2). Based on this, the first path 164(1) is selected. In implementations in which more than two view poses 162 are evaluated, the path plan costs 274 may be ranked or ordered, and the path plan cost 274 that is lowest may be selected. In other implementations, other techniques may be used to select the view pose 162.

At 730 the AMD 108 is moved to first view pose 162(2) using the first path 164(1) as represented by the first path plan data 276(1).

At 706 a process is described that involves selecting a single view pose 162 in the situation in which two or more different tasks involve the same object. This situation is discussed with regard to FIG. 5.

At 740 a second task is determined. The second task is associated with the first object ID 256(1) and a second task type 258(2).

At 742, based on the second task type 258(2) and the first map data 158, a second region 160(2) is determined.

At 744 the first location of the first view pose 162(1) is determined to be within both the first region 160(1) and the second region 160(2). For example, the first view pose 162(1) is located within the intersectional area of the two regions 160(1)-(2), each of the regions 160 being a region within which the likelihood of completion of the respective task type 258 is deemed to be acceptable.

At 708 a process is described that involves the situation in which two or more different tasks involve the same object, and more than one view pose 162 is used to acquire information about that object.

At 760 a second task that is associated with the first object ID 256(1) and a second task type 258(2) is determined. For example, a second view object request 254(2) may have been sent by the application module(s) 250.

At 762, based on the second task type 258(2) and the first map data 158, a second region 160(2) is determined.

At 764 a second view pose 162(2) is determined within the second region 160(2). The second view pose 162(2)

comprises a second location within the second region 160(2) and a second orientation at the second location of one or more of the first sensor 140(1) or the AMD 108.

At 766 the AMD 108 moves, using the one or more motors 148, to the second view pose 162(2). This movement may occur before or after the movement to the first view pose 162(1) as described with regard to FIG. 6.

At 768 second sensor data 142(2) is acquired at the second view pose 162(2) using one or more of the sensors 140, such as the first sensor 140(1).

At 770 the second task is performed using the second sensor data 142(2). For example, the second sensor data 142(2) may be processed by one or more of the perception modules 210 that are associated with the second task. If the second task is unable to be completed, the process may be repeated.

Figure 8:
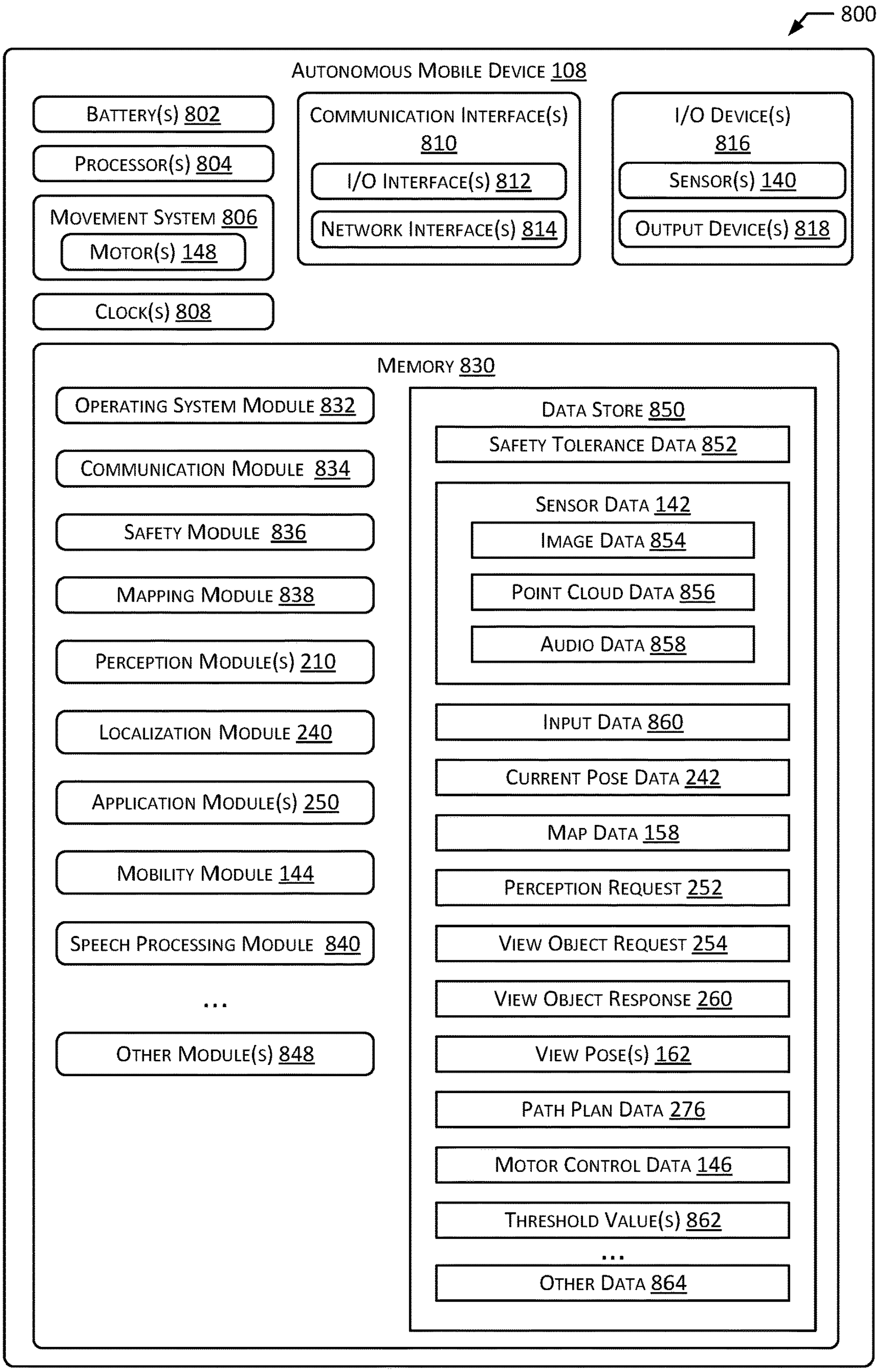
FIG. 8 is a block diagram of the AMD, according to some implementations.

FIG. 8 is a block diagram 800 of the AMD 108, according to some implementations.

The AMD 108 may include one or more batteries 802 to provide electrical power suitable for operating the components in the AMD 108. In some implementations other devices may be used to provide electrical power to the AMD 108. For example, power may be provided by wireless power transfer, capacitors, fuel cells, storage flywheels, and so forth.

The AMD 108 may include one or more hardware processors 804 (processors) configured to execute one or more stored instructions. The processors 804 may comprise one or more cores. The processors 804 may include microcontrollers, systems on a chip (SoC), field programmable gate arrays, digital signal processors, graphic processing units, general processing units, and so forth.

A movement system 806 of the AMD 108 may include one or more wheels or legs that are driven by one or more motors 148 or other actuators to enable the AMD 108 to move from one location in the physical space 110 to another.

One or more clocks 808 may provide information indicative of date, time, ticks, and so forth. For example, the processor 804 may use data from the clock 802 to associate a particular time with an action, sensor data 142, and so forth.

The AMD 108 may include one or more communication interfaces 810 such as input/output (I/O) interfaces 812, network interfaces 814, and so forth. The communication interfaces 810 enable the AMD 108, or components thereof, to communicate with other devices or components. The communication interfaces 810 may include one or more I/O interfaces 812. The I/O interfaces 812 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include input devices such as one or more of a sensor 140, keyboard, mouse, scanner, and so forth. The I/O devices 816 may also include output devices 818 such as one or more of a motor 148, light, speaker, display, projector, printer, and so forth. In some embodiments, the I/O devices 816 may be physically incorporated with the AMD 108 or may be externally placed.

The network interfaces 814 may be configured to provide communications between the AMD 108 and other devices such as other AMDs 108, docking stations, routers, access points, and so forth. The network interfaces 814 may include devices configured to couple to personal area networks (PANs), local area networks (LANs), wireless local area networks (WLANS), wide area networks (WANs), and so forth. For example, the network interfaces 814 may include devices compatible with Ethernet, Wi-Fi, Bluetooth, Bluetooth Low Energy, ZigBee, and so forth. The AMD 108 may also include one or more buses or other internal communications hardware or software that allow for the transfer of data between the various modules and components of the AMD 108.

As shown in FIG. 8, the AMD 108 includes one or more memories 830. The memory 830 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 830 provides storage of computer-readable instructions, data structures, program modules, and other data for the operation of the AMD 108. A few example functional modules are shown stored in the memory 830, although the same functionality may alternatively be implemented in hardware, firmware, or as a system on a chip (SoC). The modules may access data stored within a data store 850. These modules may be executed as foreground applications, background tasks, daemons, and so forth. The data store 850 may use a flat file, database, linked list, tree, executable code, script, or other data structure to store information. In some implementations, the data store 850 or a portion of the data store 850 may be distributed across one or more other devices including other AMDs 108, servers, network attached storage devices, and so forth.

The memory 830 may include at least one operating system (OS) module 832. The OS module 832 is configured to manage hardware resource devices such as the I/O interfaces 812, the I/O devices 816, the communication interfaces 810, and provide various services to applications or modules executing on the processors 804. The OS module 832 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; or the Robot Operating System (ROS).

A communication module 834 may be configured to establish communication with other devices, such as other AMDs 108, an external server, a docking station, and so forth. The communications may be authenticated, encrypted, and so forth.

A safety module 836 may access safety tolerance data 852 to determine within what tolerances the AMD 108 may operate safely within the physical space 110. The safety module 836 may include, or operate in conjunction with, a collision avoidance system. For example, the safety module 836 may be configured to stop the AMD 108 from moving when an object 112 is determined to be present along the AMD's 108 path of travel. Movement of the AMD 108 may be stopped by one or more of inhibiting operations of one or more of the motors 148, issuing a command to stop motor operation, disconnecting power from one or more of the motors 148, and so forth. The safety module 836 may be implemented as hardware, software, or a combination thereof.

The safety module 836 may control other factors, such as a maximum speed of the AMD 108 based on information obtained by the sensors 140, precision and accuracy of the sensor data 142, and so forth. For example, a maximum speed permitted by the safety module 836 may be based on one or more factors such as the weight of the AMD 108, nature of the floor, distance to a nearest object 112, and so forth.

As the AMD 108 moves through the physical space 110, a mapping module 838 may use sensor data 142 to determine the map data 158 representative of the physical space 110. For example, image data 854 from one or more cameras may be processed to determine the presence of objects 112, approximate locations in the physical space 110, category of object 112, and so forth. The map data 158 may represent the dimensions of the physical space 110 and objects 112 within the physical space 110. The map data 158 may also include information about the object 112, such as size, position, and orientation. In some implementations the mapping module 838 may utilize information from, or may be part of, the localization module 240.

In some implementations, the map data 158 may comprise a plurality of cells with each cell of the plurality of cells representing a particular area in the physical space 110. The map data 158 may indicate whether an area of the physical space 110 associated with a given cell includes an object 112.

The memory 830 may also include one or more of the perception module(s) 210, the localization module 240, the application module(s) 250, the mobility module 144, and so forth, as described above.

The AMD 108 may move responsive to a determination made by an onboard processor 804, in response to a command received from one or more communication interfaces 810, as determined from the sensor data 142, and so forth. For example, an external server may send a command that is received using the network interface 814. This command may direct the AMD 108 to proceed to find a particular user, follow a particular user, and so forth. The AMD 108 may then process this command and use the mobility module 144 to determine the directions and distances associated with carrying out the command. For example, the command to "come here" may result in the application module 250 sending a request to the mobility module 144 to move the AMD 108 to a particular location near the user and orient the AMD 108 in a particular direction.

A speech processing module 840 may be used to process utterances of the user. Microphones may acquire audio data 858 representing sound in the presence of the AMD 108. The audio data 858 may be processed to determine the presence of a wakeword that indicates a user intends to speak a command to the AMD 108. Once the wakeword is detected, circuitry or applications of the local AMD 108 may "wake" and begin processing additional audio data 858. This additional processing may be performed at the AMD 108 or may be sent to an external device for further processing. For example, the audio data 858 acquired after a wakeword is detected may be sent to a speech processing module 840.

The speech processing module 840 may include or access an automated speech recognition (ASR) module. The ASR module may accept as input audio data 858 and may produce as output data comprising a text string or other data representation. The data comprising the text string or other data representation may be processed by one or more modules of the AMD 108 to determine the command to be executed. For example, the utterance of the command "robot, come here" may result in data comprising the text string "come here". The wakeword "robot" may be omitted from the data.

The modules may access data stored within the data store 850, including safety tolerance data 852, sensor data 142, input data 860, the current pose data 242, the map data 158, the perception request 252, the view object request 254, the view object response 260, data indicative of the view poses 162, the path plan data 276, the motor control data 146, one or more threshold values 862, or other data 864.

The sensor data 142 may comprise data acquired by one or more of the sensors 140 of the AMD 108 or affiliated with the AMD 108. For example, the sensor data 142 may comprise image data 854 acquired using cameras, point cloud data 856 acquired from a distance sensing device such as LIDAR or a depth camera, the audio data 858, and so forth.

The input data 860 may comprise input to the AMD 108, such as user input or input from an external device. For example, the input data 860 may comprise a text string provided by the speech processing module 840 or data acquired from a graphical user interface.

The threshold values 862 may comprise information indicative of the various thresholds or ranges used by the modules described. For example, the threshold values 862 may include a minimum size of a region 160, a minimum acceptable confidence value, and so forth.

The data store 850 may store the other data 864 as well. For example, localization settings may indicate local preferences such as language, user identifier data may be stored that allows for identification of a particular user, and so forth.

The AMD 108 may connect to the network using one or more of the network interfaces 814. In some implementations, one or more of the modules or other functions described here may execute on the processors 804 of the AMD 108, on a server, or a combination thereof. For example, one or more servers may provide various functions, such as ASR, natural language understanding (NLU), providing content such as audio or video to the AMD 108, and so forth.

Other modules 848 may be included in the memory 830. The other modules 848 may provide other functionality, such as object recognition, speech synthesis, user identification, and so forth. The other modules 848 may comprise a speech synthesis module that is able to convert text data to human speech. For example, the speech synthesis module may be used by the AMD 108 to provide speech that a user is able to understand.

Modules described herein, such as the perception modules 210, may provide various processing functions such as de-noising, filtering, and so forth. Processing of sensor data 142, such as image data 854 from a camera, may be performed by a module implementing, at least in part, one or more of the following tools or techniques. In one implementation, processing of image data 854 may be performed, at least in part, using one or more tools available in the OpenCV library as developed by Intel Corporation of Santa Clara, California, USA; Willow Garage of Menlo Park, California, USA. In another implementation, functions available in the OKAO machine vision library as promulgated by Omron Corporation of Kyoto, Japan, may be used to process the sensor data 142. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 142 or other data. For example, the ANN may be trained using a supervised learning algorithm such that object identifiers are associated with images of particular objects within training images provided to the ANN. Once trained, the ANN may be provided with the sensor data 142 and produce output indicative of the object identifier.

Figure 9:
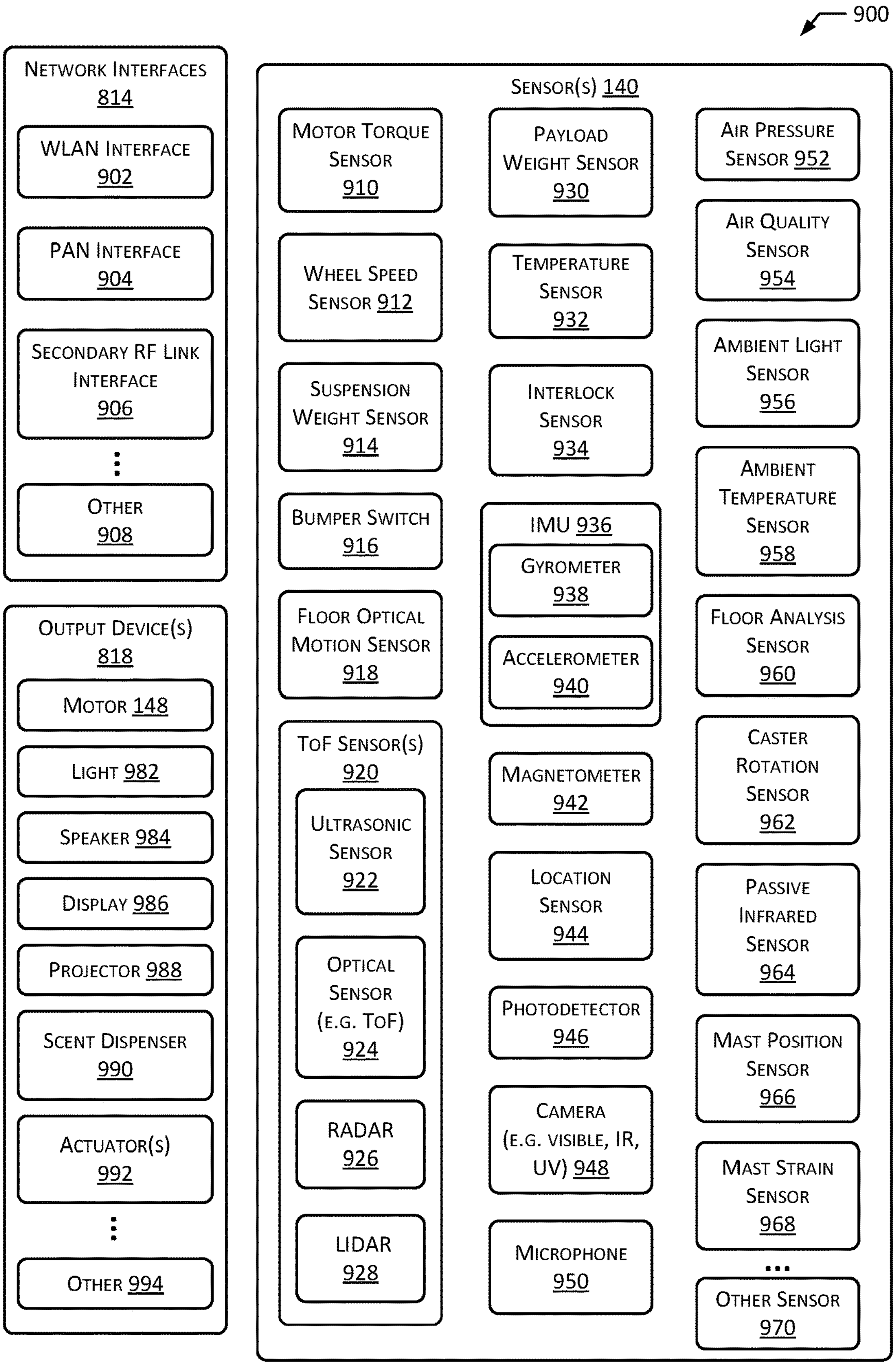
FIG. 9 is a block diagram of some components of the AMD, according to some implementations.

FIG. 9 is a block diagram 900 of some components of the AMD 108 such as network interfaces 814, sensors 140, and output devices 818, according to some implementations. The components illustrated here are provided by way of illustration and not necessarily as a limitation. For example, the AMD 108 may utilize a subset of the particular network interfaces 814, output devices 818, or sensors 140 depicted here, or may utilize components not pictured. One or more of the sensors 140, output devices 818, or a combination thereof may be included on a moveable component that may be panned, tilted, rotated, or any combination thereof with respect to a chassis of the AMD 108.

The network interfaces 814 may include one or more of a WLAN interface 902, PAN interface 904, secondary radio frequency (RF) link interface 906, or other interface 908. The WLAN interface 902 may be compliant with at least a portion of the Wi-Fi specification. For example, the WLAN interface 902 may be compliant with at least a portion of the IEEE 802.11 specification as promulgated by the Institute of Electrical and Electronics Engineers (IEEE). The PAN interface 904 may be compliant with at least a portion of one or more of the Bluetooth, wireless USB, Z-Wave, ZigBee, or other standards. For example, the PAN interface 904 may be compliant with the Bluetooth Low Energy (BLE) specification.

The secondary RF link interface 906 may comprise a radio transmitter and receiver that operate at frequencies different from or using modulation different from the other interfaces. For example, the WLAN interface 902 may utilize frequencies in the 2.4 GHZ and 5 GHz Industrial Scientific and Medicine (ISM) bands, while the PAN interface 904 may utilize the 2.4 GHz ISM bands. The secondary RF link interface 906 may comprise a radio transmitter that operates in the 900 MHz ISM band, within a licensed band at another frequency, and so forth. The secondary RF link interface 906 may be utilized to provide backup communication between the AMD 108 and other devices in the event that communication fails using one or more of the WLAN interface 902 or the PAN interface 904. For example, in the event the AMD 108 travels to an area within the physical space 110 that does not have Wi-Fi coverage, the AMD 108 may use the secondary RF link interface 906 to communicate with another device such as a specialized access point, docking station, or other AMD 108.

The other 908 network interfaces may include other equipment to send or receive data using other wavelengths or phenomena. For example, the other 908 network interface may include an ultrasonic transceiver used to send data as ultrasonic sounds, a visible light system that communicates by modulating a visible light source such as a light-emitting diode, and so forth. In another example, the other 908 network interface may comprise a wireless wide area network (WWAN) interface or a wireless cellular data network interface. Continuing the example, the other 908 network interface may be compliant with at least a portion of the LTE, 5G, 6G, or other standards.

The AMD 108 may include one or more of the following sensors 140. The sensors 140 depicted here are provided by way of illustration and not necessarily as a limitation. It is understood that other sensors 140 may be included or utilized by the AMD 108, while some sensors 140 may be omitted in some configurations.

The motor torque sensor 910 may comprise circuitry to determine a shaft torque of one or more of the motors 148 of the movement system 806. In some implementations, the motor torque may be determined based on back electromotive force, output from a strain gauge, input amperage, rotational speed as provided by a wheel speed sensor 912, or other techniques.

A wheel speed sensor 912 provides information indicative of the rotation or linear extension of a motor 148. The motor 148 may comprise a rotary motor, or a linear actuator. In some implementations, the wheel speed sensor 912 may comprise a separate assembly such as a photodiode and encoder wheel that is affixed to the motor 148. In other implementations, the wheel speed sensor 912 may comprise circuitry configured to drive the motor 148. For example, the mobility module 144 may utilize the data from the wheel speed sensor 912 to estimate a distance traveled.

A suspension weight sensor 914 provides information indicative of the weight of the AMD 108 on the suspension system for one or more of the wheels or the caster. For example, the suspension weight sensor 914 may comprise a switch, strain gauge, load cell, photodetector 946, or other sensing element that is used to determine whether weight is applied to a particular wheel, or whether weight has been removed from the wheel. In some implementations, the suspension weight sensor 914 may provide binary data such as a "1" value indicating that there is a weight applied to the wheel, while a "0" value indicates that there is no weight applied to the wheel. In other implementations, the suspension weight sensor 914 may provide an indication such as so many kilograms of force or newtons of force. The suspension weight sensor 914 may be affixed to one or more of the wheels or the caster. In some situations, the safety module 836 may use data from the suspension weight sensor 914 to determine whether or not to inhibit operation of one or more of the motors 148. For example, if the suspension weight sensor 914 indicates no weight on the suspension, the implication is that the AMD 108 is no longer resting on its wheels, and thus operation of the motors 148 may be inhibited. In another example, if the suspension weight sensor 914 indicates weight that exceeds a threshold value 862, the implication is that something heavy is resting on the AMD 108 and thus operation of the motors 148 may be inhibited. For example, the threshold value 862 may comprise a weight of a load that compresses a suspension system to a minimum height, or results in a mass that exceeds a torque output of the motors 148 to maintain a minimum acceleration.

One or more bumper switches 916 provide an indication of physical contact between a bumper or other member that is in mechanical contact with the bumper switch 916. The safety module 836 utilizes sensor data 142 obtained by the bumper switches 916 to modify the operation of the AMD 108. For example, if the bumper switch 916 associated with a front of the AMD 108 is triggered, the safety module 836 may drive the AMD 108 backwards.

A floor optical motion sensor (FOMS) 918 provides information indicative of motion of the AMD 108 relative to the floor or other surface underneath the AMD 108. In one implementation, the FOMS 918 may comprise a light source such as a light-emitting diode (LED), an array of photodiodes, and so forth. In some implementations, the FOMS 918 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 918 may provide other information, such as data indicative of a pattern present on the floor, composition of the floor, color of the floor, and so forth. For example, the FOMS 918 may utilize an optoelectronic sensor that may detect different colors or shades of gray, and this data may be used to generate floor characterization data. The floor characterization data may be used for navigation.

The ToF sensors 920 may comprise one or more of an ultrasonic sensor 922, optical sensor 924, RADAR 926, LIDAR 928, and so forth. The ToF sensors 920 use a time of flight of an emitted signal that is reflected by an object 112 to determine a presence of an object 112 and a distance to that object 112.

The ultrasonic sensor 922 utilizes sounds in excess of 20 kHz to determine a distance from the sensor 140 to an object 112. The ultrasonic sensor 922 may comprise an emitter such as a piezoelectric transducer and a detector such as an ultrasonic microphone. The emitter may generate specifically timed pulses of ultrasonic sound while the detector listens for an echo of that sound being reflected from an object 112 within the field-of-view. The ultrasonic sensor 922 may provide information indicative of a presence of an object 112, distance to the object 112, and so forth. Two or more ultrasonic sensors 922 may be utilized in conjunction with one another to determine a location within a two-dimensional plane of the object 112.

In some implementations, the ultrasonic sensor 922 or a portion thereof may be used to provide other functionality. For example, the emitter of the ultrasonic sensor 922 may be used to transmit data and the detector may be used to receive data transmitted that is ultrasonic sound. In another example, the emitter of an ultrasonic sensor 922 may be set to a particular frequency and used to generate a particular waveform such as a sawtooth pattern to provide a signal that is audible to an animal, such as a dog or a cat.

The optical sensor 924 may provide sensor data 142 indicative of one or more of a presence or absence of an object 112, a distance to the object 112, or characteristics of the object 112. The optical sensor 924 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object 112 may be determined. The optical sensor 924 may utilize one or more sensing elements. For example, the optical sensor 924 may comprise a 4×4 array of light sensing elements. Each individual sensing element may be associated with a field-of-view (FOV) that is directed in a different way. For example, the optical sensor 924 may have four light sensing elements, each associated with a different 10° FOV, allowing the sensor 140 to have an overall FOV of 40°.

In another implementation, a structured light pattern may be provided by the optical emitter. A portion of the structured light pattern may then be detected on the object 112 using a sensor 140 such as an image sensor or camera 948. Based on an apparent distance between the features of the structured light pattern, the distance to the object 112 may be calculated. Other techniques may also be used to determine distance to the object 112. In another example, the color of the reflected light may be used to characterize the object 112, such as whether the object 112 is skin, clothing, flooring, upholstery, and so forth. In some implementations, the optical sensor 924 may operate as a depth camera, providing a two-dimensional image of a scene, as well as data that indicates a distance to each pixel.

Data from the optical sensors 924 may be utilized for collision avoidance. For example, the safety module 836, and the mobility module 144 may utilize the sensor data 142 indicative of the distance to an object 112 in order to prevent a collision with that object 112.

Multiple optical sensors 924 may be operated such that their FOVs overlap at least partially. To minimize or eliminate interference, the optical sensors 924 may selectively control one or more of the timing, modulation, or frequency of the light emitted. For example, a first optical sensor 924 may emit light modulated at 90 kHz while a second optical sensor 924 emits light modulated at 93 kHz.

The sensors 140 may include a RADAR 926. The RADAR 926 may be used to provide information as to a distance, lateral position, and so forth, to an object 112.

The sensors 140 may include a LIDAR 928. The LIDAR 928 may use a projected spot of laser light that is scanned across a scene to provide information as to a distance, lateral position, and so forth, to an object 112.

The AMD 108 may include a modular payload bay. A payload weight sensor 930 provides information indicative of the weight associated with the modular payload bay. The payload weight sensor 930 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 930 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 930 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 836 may utilize the payload weight sensor 930 to determine if the modular payload bay has been overloaded. If so, an alert or notification may be issued.

One or more device temperature sensors 932 may be utilized by the AMD 108. The device temperature sensors 932 provide temperature data of one or more components within the AMD 108. For example, a device temperature sensor 932 may indicate a temperature of one or more the batteries 802, one or more motors 148, and so forth. In the event the temperature exceeds a threshold value 862, the component associated with that device temperature sensor 932 may be shut down. For example, the threshold value 862 may be determined based on component specifications, such as a maximum permissible temperature of the batteries 802.

One or more interlock sensors 934 may provide data to the safety module 836 or other circuitry that prevents the AMD 108 from operating in an unsafe condition. For example, the interlock sensors 934 may comprise switches that indicate whether an access panel is open. The interlock sensors 934 may be configured to inhibit operation of the AMD 108 until the interlock switch indicates a safe condition is present.

A gyrometer 938 may provide information indicative of rotation of an object 112 affixed thereto. For example, a gyrometer 938 may generate sensor data 142 that is indicative of a change in orientation of the AMD 108 or a portion thereof.

An accelerometer 940 provides information indicative of a direction and magnitude of an imposed acceleration. Data such as rate of change, determination of changes in direction, speed, and so forth may be determined using the accelerometer 940. The accelerometer 940 may comprise mechanical, optical, micro-electromechanical, or other devices. For example, the gyrometer 938 in the accelerometer 940 may comprise a prepackaged solid-state inertial measurement unit (IMU) 936 that provides multiple axis gyrometers 938 and accelerometers 940.

A magnetometer 942 may be used to determine an orientation by measuring ambient magnetic fields, such as the terrestrial magnetic field. For example, the magnetometer 942 may comprise a Hall effect transistor that provides output compass data indicative of a magnetic heading.

The AMD 108 may include one or more location sensors 944. The location sensors 944 may comprise an optical, radio, or other navigational system such as a global positioning system (GPS) receiver. For indoor operation, the location sensors 944 may comprise indoor position systems, such as using Wi-Fi Positioning Systems (WPS). The location sensors 944 may provide information indicative of a relative location, such as "living room" or an absolute location such as particular coordinates indicative of latitude and longitude, or displacement with respect to a predefined origin.

A photodetector 946 provides sensor data 142 indicative of impinging light. For example, the photodetector 946 may provide data indicative of a color, intensity, duration, and so forth.

A camera 948 generates sensor data 142 indicative of one or more images. The camera 948 may be configured to detect light in one or more wavelengths including, but not limited to, terahertz, infrared, visible, ultraviolet, and so forth. For example, an infrared camera 948 may be sensitive to wavelengths between approximately 700 nanometers and 1 millimeter. The camera 948 may comprise charge coupled devices (CCD), complementary metal oxide semiconductor (CMOS) devices, microbolometers, and so forth. The AMD 108 may use image data 854 acquired by the camera 948 for object recognition, navigation, collision avoidance, user communication, and so forth. For example, a pair of cameras 948 sensitive to infrared light may be mounted on the front of the AMD 108 to provide binocular stereo vision, with the sensor data 142 comprising images being sent to the mobility module 144. In another example, the camera 948 may comprise a 10 megapixel or greater camera that is used for videoconferencing or for acquiring pictures for the user.

The camera 948 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects 112 are moving. In contrast, with a global shutter the light sensor is exposed all at a single time, and subsequently read out. In some implementations, the camera(s) 948, particularly those associated with navigation or autonomous operation, may utilize a global shutter. In other implementations, the camera(s) 948 providing images for use by the mobility module 144 may be acquired using a rolling shutter and subsequently may be processed to mitigate image artifacts.

One or more microphones 950 may be configured to acquire information indicative of sound present in the physical space 110. In some implementations, arrays of microphones 950 may be used. These arrays may implement beamforming techniques to provide for directionality of gain. The AMD 108 may use the one or more microphones 950 to acquire information from acoustic tags, accept voice input from users, determine a direction of an utterance, determine ambient noise levels, for voice communication with another user or system, and so forth.

An air pressure sensor 952 may provide information indicative of an ambient atmospheric pressure or changes in ambient atmospheric pressure. For example, the air pressure sensor 952 may provide information indicative of changes in air pressure due to opening and closing of doors, weather events, and so forth.

An air quality sensor 954 may provide information indicative of one or more attributes of the ambient atmosphere. For example, the air quality sensor 954 may include one or more chemical sensing elements to detect the presence of carbon monoxide, carbon dioxide, ozone, and so forth. In another example, the air quality sensor 954 may comprise one or more elements to detect particulate matter in the air, such as a photoelectric detector, ionization chamber, and so forth. In another example, the air quality sensor 954 may include a hygrometer that provides information indicative of relative humidity.

An ambient light sensor 956 may comprise one or more photodetectors 946 or other light-sensitive elements that are used to determine one or more of the color, intensity, or duration of ambient lighting around the AMD 108.

An ambient temperature sensor 958 provides information indicative of the temperature of the ambient physical space 110 proximate to the AMD 108. In some implementations, an infrared temperature sensor may be utilized to determine the temperature of another object 112 at a distance.

A floor analysis sensor 960 may include one or more components that are used to generate at least a portion of floor characterization data. In one implementation, the floor analysis sensor 960 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 960 may be used by one or more of the safety module 836, mobility module 144, the application module 250, and so forth. For example, if the floor analysis sensor 960 determines that the floor is wet, the safety module 836 may decrease the speed of the AMD 108 and generate a notification alerting the user.

The floor analysis sensor 960 may include other components as well. For example, a coefficient of friction sensor may comprise a probe that comes into contact with the surface and determines the coefficient of friction between the probe and the floor.

A caster rotation sensor 962 provides data indicative of one or more of a direction of orientation, angular velocity, linear speed of the caster, and so forth. For example, the caster rotation sensor 962 may comprise an optical encoder and corresponding target that is able to determine that the caster transitioned from an angle of 0° at a first time to 49° at a second time.

The sensors 140 may include a passive infrared (PIR) sensor 964. The PIR sensor 964 may be used to detect the presence of users, pets, hotspots, and so forth. For example, the PIR sensor 964 may be configured to detect infrared radiation with wavelengths between 8 and 14 micrometers.

The AMD 108 may include a mast. A mast position sensor 966 provides information indicative of a position of the mast of the AMD 108. For example, the mast position sensor 966 may comprise limit switches associated with the mast extension mechanism that indicate whether the mast is at an extended or retracted position. In other implementations, the mast position sensor 966 may comprise an optical code on at least a portion of the mast that is then interrogated by an optical emitter and a photodetector 946 to determine the distance to which the mast is extended. In another implementation, the mast position sensor 966 may comprise an encoder wheel that is attached to a mast motor that is used to raise or lower the mast. The mast position sensor 966 may provide data to the safety module 836. For example, if the AMD 108 is preparing to move, data from the mast position sensor 966 may be checked to determine if the mast is retracted, and if not, the mast may be retracted prior to beginning movement.

A mast strain sensor 968 provides information indicative of a strain on the mast with respect to the remainder of the AMD 108. For example, the mast strain sensor 968 may comprise a strain gauge or load cell that measures a side-load applied to the mast or a weight on the mast or downward pressure on the mast. The safety module 836 may utilize sensor data 142 obtained by the mast strain sensor 968. For example, if the strain applied to the mast exceeds a threshold amount, the safety module 836 may direct an audible and visible alarm to be presented by the AMD 108.

The AMD 108 may include other sensors 970 as well. For example, a capacitive proximity sensor may be used to provide proximity data to adjacent objects 112. Other sensors 970 may include radio frequency identification (RFID) readers, near field communication (NFC) systems, coded aperture cameras, and so forth. For example, NFC tags may be placed at various points within the physical space 110 to provide landmarks for the mobility module 144. One or more touch sensors may be utilized to determine contact with a user or other objects 112.

The AMD 108 may include one or more output devices 818. A motor 148 may be used to provide linear or rotary motion. A light 982 may be used to emit photons. A speaker 984 may be used to emit sound. A display 986 may comprise one or more of a liquid crystal display, light emitting diode display, electrophoretic display, cholesteric liquid crystal display, interferometric display, and so forth. The display 986 may be used to present visible information such as graphics, pictures, text, and so forth. In some implementations, the display 986 may comprise a touchscreen that combines a touch sensor and a display 986.

In some implementations, the AMD 108 may be equipped with a projector 988. The projector 988 may be able to project an image on a surface, such as the floor, wall, ceiling, and so forth.

A scent dispenser 990 may be used to emit one or more smells. For example, the scent dispenser 990 may comprise a plurality of different scented liquids that may be evaporated or vaporized in a controlled fashion to release predetermined amounts of each.

One or more moveable component actuators 992 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 992 to produce movement of the moveable component.

In other implementations, other 994 output devices may be utilized. For example, the AMD 108 may include a haptic output device that provides output that produces particular touch sensations to the user. Continuing the example, a motor 148 with an eccentric weight may be used to create a buzz or vibration to allow the AMD 108 to simulate the purr of a cat.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the FIGURES above may be eliminated, combined, or performed in an alternate order. Any steps or operations may be performed serially or in parallel. Furthermore, the order in which the operations are described is not intended to be construed as a limitation.

In other implementations, other types of autonomous mobile devices may use the systems and techniques described herein. For example, the AMD 108 may comprise an autonomous ground vehicle, an autonomous aerial vehicle in the air, autonomous marine vehicle, and so forth.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
a first sensor having a first field-of-view (FOV);
one or more motors;
one or more processors; and
one or more computer readable media storing processor executable instructions which, when executed using the one or more processors, cause the AMD to:
store first region data indicating a first region for a first map, wherein the first region is associated with:
a first portion of a physical space,
a first object,
a first task type that utilizes sensor data of the first object, and
a first metric that is indicative of a likelihood of successful completion of the first task type by the AMD within the first region;
determine a first task, wherein the first task is associated with the first object and the first task type;
determine that the first metric associated with the first task type is greater than a threshold value;
responsive to determining that the first metric associated with the first task type is greater than the threshold value, determine, based on the first task and the first map, that moving the AMD to within the first region will allow for successful completion of the first task;
determine a first location within the first region that will allow for successful completion of the first task;
determine a first orientation for the first sensor at the first location that will allow for successful completion of the first task;
move, using the one or more motors:
the AMD to the first location, and
the first sensor to the first orientation; and
acquire first sensor data using the first sensor at the first location and the first orientation as part of performing the first task.

2. The AMD of claim 1, wherein the one or more computer readable media storing processor executable instructions which, when executed using the one or more processors, cause the AMD to:
store second region data indicating a second region for the first map, wherein the second region is associated with:
the first object,
the first task type that utilizes sensor data of the first object,
a second portion of the physical space, and
a second metric that is indicative of a likelihood of successful completion of the first task type by the AMD within the second region;
determine, based on the first task and the first map, the second region; and
compare the first metric to the second metric.

3. The AMD of claim 1, wherein the one or more computer readable media storing processor executable instructions which, when executed using the one or more processors, cause the AMD to:
determine a second location within the first region;
determine a second orientation of the first sensor at the second location;
determine a starting location and a starting orientation of the AMD;
determine a first path plan cost of a first path from the starting location and the starting orientation to the first location and the first orientation;
determine a second path plan cost of a second path from the starting location and the starting orientation to the second location and the second orientation; and
determine whether to move to the first location within the first region or the second location within the first region based on comparing the first path plan cost to the second path plan cost.

4. The AMD of claim 3, wherein the first path plan cost is based on one or more of:
a first length of the first path,
a first number of turns of the first path, or
a first estimated time to traverse the first path; and
wherein the second path plan cost is based on one or more of:
a second length of the second path,
a second number of turns of the second path, or
a second estimated time to traverse the second path.

5. The AMD of claim 1, wherein the one or more computer readable media storing processor executable instructions which, when executed using the one or more processors, cause the AMD to:
determine a second task, wherein the second task is associated with the first object and a second task type;
determine, based on the second task and the first map, a second region; and
determine that the first location is within both the first region and the second region.

6. The AMD of claim 1, wherein the one or more computer readable media storing processor executable instructions which, when executed using the one or more processors, cause the AMD to:
determine a second task, wherein the second task is associated with the first object and a second task type;
determine, based on the second task and the first map, a second region;
determine a second location within the second region;
determine a second orientation of the first sensor at the second location;
move, using the one or more motors:
the AMD to the second location, and
the first sensor to the second orientation; and
acquire second sensor data using the first sensor.

7. The AMD of claim 1, wherein the one or more computer readable media storing processor executable instructions which, when executed using the one or more processors, cause the AMD to:
acquire second sensor data using the first sensor, wherein the second sensor data is acquired at a second location and a second orientation of the first sensor;
determine the first portion of the physical space based on the second location; and
determine the first metric based on performance of the first task type using the second sensor data.

8. The AMD of claim 1, wherein the one or more computer readable media storing processor executable instructions which, when executed using the one or more processors, cause the AMD to:

acquire second sensor data using the first sensor, wherein the second sensor data is acquired at a second location and a second orientation of the first sensor;

determine that the first object is represented by the second sensor data;

determine user input indicative of the first object;

determine the first portion of the physical space based on the second location; and determine the first metric based on performance of the first task type using the second sensor data.

9. A computer-implemented method comprising:

determining a first map comprising a first region, wherein the first region is associated with:

a first object, a first task type that utilizes sensor data of the first object that is acquired by a first sensor, a first portion of a physical space, and a first metric that is indicative of a likelihood of successful completion of the first task type by an autonomous mobile device (AMD) within the first region;

determining a first task, wherein the first task is associated with the first object and the first task type;

determining that the first metric associated with the first task type is greater than a threshold value;

responsive to the determining that the first metric associated with the first task type is greater than the threshold value, determining, based on the first task and the first map, that moving the AMD to within the first region will allow for successful completion of the first task;

determining a first location within the first region that allows for successful completion of the first task;

determining a first orientation of the first sensor at the first location that allows for successful completion of the first task;

moving, using one or more motors:

the AMD to the first location, and the first sensor to the first orientation; and acquiring first sensor data using the first sensor at the first location and the first orientation as part of performing the first task.

10. The method of claim 9, further comprising:

the first map further comprising a second region, wherein the second region is associated with:

the first object, the first task type that utilizes sensor data of the first object, a second portion of a physical space, and a second metric that is indicative of a likelihood of successful completion of the first task type by the AMD within the second region;

determining, based on the first task and the first map, the second region; and determining the first location based on the first metric being greater than the second metric.

11. The method of claim 9, further comprising:

determining a second location within the first region;

determining a second orientation of the first sensor at the second location;

determining a starting location and a starting orientation of the AMD;

determining a first path plan cost of a first path from the starting location and the starting orientation to the first location and the first orientation;

determining a second path plan cost of a second path from the starting location and the starting orientation to the second location and the second orientation;

determining the first path plan cost is less than the second path plan cost; and moving, using the one or more motors, the AMD using the first path.

12. The method of claim 9, further comprising:

determining a second task, wherein the second task is associated with the first object and a second task type;

determining, based on the second task and the first map, a second region; and determining the first location that is within both the first region and the second region.

13. The method of claim 9, further comprising:

determining a second task, wherein the second task is associated with the first object and a second task type;

determining, based on the second task and the first map, a second region;

determining a second location within the second region;

determining a second orientation of the first sensor at the second location;

moving, using the one or more motors:

the AMD to the second location, and a first FOV of the first sensor to the second orientation; and acquiring second sensor data using the first sensor.

14. The method of claim 9, further comprising:

acquiring second sensor data using the first sensor, wherein the second sensor data is acquired at a second location and a second orientation of the first sensor;

determining the first portion of the physical space based on the second location; and determining the first metric based on performance of the first task type using the second sensor data.

15. The method of claim 9, further comprising:

acquiring, at a first time, second sensor data using the first sensor, wherein the second sensor data is acquired at a second location and a second orientation of the first sensor;

acquiring, at a second time, third sensor data using the first sensor, wherein the third sensor data is acquired at a third location and a third orientation of the first sensor;

determining a third time based on output from a clock;

determining a difference between the third time and the first time is greater than a threshold value;

determining a difference between the third time and the second time is less than a second threshold value;

determining the first portion of the physical space based on the second location and omitting the third location; and determining the first metric based on performance of the first task type using the second sensor data and omitting the third sensor data.

16. An autonomous mobile device (AMD) comprising:

a first sensor having a first field-of-view (FOV);

one or more motors; and one or more processors to execute instructions to:

move, using the one or more motors, the AMD to one or more poses within a physical space, wherein each pose comprises:

a location, and an orientation of the first FOV;

acquire a first set of sensor data at the one or more poses;

determine a set of one or more task types; and determine, based on processing the first set of sensor data using one or more of the task types associated with the set of one or more task types, first map data comprising one or more regions, wherein each region is associated with:

a respective object, a respective task type of the set of one or more task types, a respective portion of the physical space, and a respective metric that is indicative of a likelihood of successful completion of the respective task type by the AMD within each region.

17. The AMD of claim 16, the one or more processors to execute the instructions to:

determine a first task;

determine, based on the first task, a first path plan indicative of a path through the physical space, wherein the first path plan comprises the one or more poses within the physical space; and move, using the one or more motors, the AMD along the path.

18. The AMD of claim 16, the one or more processors to execute the instructions to:

acquire first sensor data using the first sensor, wherein second sensor data is acquired at a second location and a second orientation of the first sensor;

determine user input indicative of a first object;

determine the first object is represented by the first sensor data;

determine, based on the user input and the second location, a first region of the one or more regions, wherein the first region is associated with a first portion of the physical space; and determine, based on the second sensor data, a first metric that is indicative of a likelihood of successful completion of a first task type by the AMD within the first region.

19. The AMD of claim 16, the one or more processors to execute the instructions to:

determine a first task, wherein the first task is associated with a first object and a first task type;

determine, based on the first task and the first map data, a first region;

determine a first location within the first region;

determine a first orientation of the first sensor at the first location;

move, using the one or more motors:

the AMD to the first location, and the first FOV of the first sensor to the first orientation;

acquire first sensor data using the first sensor at the first location and the first orientation; and perform the first task based at least in part on the first sensor data.

20. The AMD of claim 19, the one or more processors to execute the instructions to:

determine a second location within the first region;

determine a second orientation of the first sensor at the second location;

determine a starting location and a starting orientation of the AMD;

determine a first path plan cost of a first path from the starting location and the starting orientation to the first location and the first orientation;

determine a second path plan cost of a second path from the starting location and the starting orientation to the second location and the second orientation;

determine the first path plan cost is less than the second path plan cost; and move, using the one or more motors, the AMD using the first path.

* * * * *